(12) United States Patent
Youngwerth et al.

(10) Patent No.: US 11,401,979 B2
(45) Date of Patent: Aug. 2, 2022

(54) CLUTCH HUB ASSEMBLY

(71) Applicant: REKLUSE RACING, LLC, Mentor, OH (US)

(72) Inventors: Albert James Youngwerth, Boise, ID (US); Sean G. Brown, Boise, ID (US); Karl E. Jensen, Boise, ID (US); Logan P. Krueger, Boise, ID (US); Gabriel Sutherland, Boise, ID (US); Sarah Haight, Boise, ID (US); Dayne Konrad, Boise, ID (US); Calvin Brown, Boise, ID (US)

(73) Assignee: Rekluse Racing, LLC, Boise, ID (US)

( * ) Notice: Subject to any disclaimer, the term of this patent is extended or adjusted under 35 U.S.C. 154(b) by 188 days.

(21) Appl. No.: 16/254,423

(22) Filed: Jan. 22, 2019

(65) Prior Publication Data

US 2019/0226531 A1 Jul. 25, 2019

Related U.S. Application Data

(60) Provisional application No. 62/619,114, filed on Jan. 19, 2018.

(51) Int. Cl.
*F16D 13/64* (2006.01)
*F16D 13/52* (2006.01)
*F16D 13/68* (2006.01)

(52) U.S. Cl.
CPC ........... *F16D 13/644* (2013.01); *F16D 13/52* (2013.01); *F16D 13/683* (2013.01); *F16D 2300/12* (2013.01)

(58) Field of Classification Search
None
See application file for complete search history.

(56) References Cited

U.S. PATENT DOCUMENTS

| 1,493,513 | A | 5/1924 | Ziska, Jr. | |
|---|---|---|---|---|
| 1,722,522 | A | 7/1929 | Hahn | |
| 6,272,725 | B1* | 8/2001 | Stout, Jr. | B23P 6/00 |
| | | | | 192/70.2 |
| 2002/0195307 | A1* | 12/2002 | Linhuber | F16D 13/648 |
| | | | | 192/70.14 |
| 2006/0081435 | A1* | 4/2006 | Heinrich | F16D 13/52 |
| | | | | 192/70.11 |
| 2016/0333944 | A1* | 11/2016 | Smith | F16D 21/06 |

OTHER PUBLICATIONS

PCT/US2019/014634 Written Opinion dated Mar. 22, 2019 (Year: 2019).*
Rekluse Racing, LLC; Supplemental European Search Report; International Application No. EP19741314 international filing date Jan. 22, 2019; earliest priority date Jan. 19, 2018.

* cited by examiner

*Primary Examiner* — Colby M Hansen
(74) *Attorney, Agent, or Firm* — Scott D. Swanson; Shaver & Swanson, LLP

(57) ABSTRACT

An improved clutch hub assembly is disclosed. The improved clutch hub assembly provides improved wear resistance at the interfaces between separator plates and a clutch hub while allowing an operator to have improved clutch lever control and modulation when manually engaging or disengaging the clutch system.

19 Claims, 21 Drawing Sheets

CLUTCH HUB ASSEMBLY

TECHNICAL FIELD

The presently disclosed technology relates to vehicle clutches, and more particularly to clutches with multi-plate clutch packs.

BACKGROUND

This invention relates to a clutch system of the friction type placed in a power transmission system. Typical clutch systems include a clutch input such as a clutch basket, a clutch output such as a center clutch or clutch hub, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

A clutch pack is typically made up of two types of plates—driving plates and driven plates. Driving plates are commonly referred to as friction discs and are coupled rotationally to a clutch basket. A clutch basket is typically coupled to an input from a motor. Driven plates are commonly referred to as separator plates and are coupled rotationally to a clutch hub. Separator plates are commonly constructed of steel. A clutch hub is typically coupled to an output such as a transmission. Typically, such clutch systems include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system. The clutch system incorporated in a 2011 Honda CRF-450R represents a typical prior art clutch system utilizing a clutch cable and a cast aluminum clutch hub. The clutch system incorporated in a 2013 KTM 350 XC-F represents a prior art clutch system utilizing a hydraulic actuation system and a clutch hub paired with moveable drive pins.

Most motorcycles incorporate a manual transmission coupled to the engine via a multi-plate clutch assembly. Typically, the multi-plate clutch is engaged/disengaged by the driver via a clutch lever mounted on the handlebar. The clutch lever operated clutch allows the driver to control the clutch engagement/disengagement. When clutch components are in good working condition, clutch lever use and feel is normal and not compromised.

A center clutch, or clutch hub, is typically formed from aluminum and is one piece where internal cutouts within a separator plate are formed to provide coupling engagement to corresponding features directly formed into the clutch hub. The aluminum construction of a clutch hub is generally preferred because aluminum is of relatively light weight while maintaining adequate strength for carrying the torque load transmitted through a clutch hub. A downside to these types of clutch hubs constructed of aluminum providing aluminum on steel contact between the hub and separator plate is that the cutouts or teeth of the separator plate can wear the corresponding surfaces in the hub they are coupled to. This wear can result in grooves or notches being formed and can cause the separator plates to bind to the hub making the operation of the clutch lever to override the clutch suboptimal. In extreme cases the clutch can drag excessively even when the clutch lever is activated fully not allowing for complete disengagement of the engine from the transmission.

In some applications, such as a 2013 KTM 350 XCF, an aluminum hub is paired with moveable drive pins cylindrical in shape where the drive pins are coupled to the clutch hub. The drive pins are also coupled to corresponding cutouts within a separator plate. Typically the drive pins are formed of steel thus providing a more wear resistant contact surface for the cutouts within the separator plates to drive against. In these configurations the moveable drive pins transmit the torque load from the separator plates to the clutch hub.

The coupling between the hub and moveable drive pins is usually achieved utilizing coupling features comprised of an oversized circular slot extending axially from the open end of the hub to the base flange of the hub terminating into an oversized counter-bored hole extending from the slot into the base flange of the hub where the oversized counter-bored hole is of the same diameter and on the same center as the oversized circular slot. The drive pins are placed with one end locating into the oversized counter-bored hole and the body of the drive pin extending within and along the slot. The drive pin extends above the open end of the hub. The bottom of the oversized counter-bored hole limits the drive pins in an axial direction toward the base flange. The fit between the drive pins and coupling features is considered a loose slide fit allowing the drive pins to freely move in an axial direction parallel to the oversized circular slot. The drive pins are also free to move radially away from the center of the hub under centrifugal force limited by the outer diameter of the pin coming into tangent contact with the wall for the oversized counter-bored hole. Lastly, the drive pins are also free to rotate within the oversized circular slot and oversized counter-bored hole. The pressure plate utilized with a hub of this type contains a feature limiting the movement of the pins axially in the direction away from the base flange. The limiting feature in the pressure plate does not contact the end of the drive pin unless the drive pin slides along the oversized circular slot toward the pressure plate. Although the moveable drive pins provide steel on steel contact with the separator plates disadvantages exist from the drive pins being moveable axially and radially relative to the coupling features within the hub. One disadvantage is the wear which takes place between the drive pins, circular slot and counter-bore from the movement of the drive pins. Torque loads can be applied and reversed rapidly due to shock loads imparted on the drive train of the vehicle. These shock loads are caused by rapid acceleration or deceleration of the motor driving the clutch, or from events causing sudden stoppage of the drive train such as landing from a jump at high speeds. The shock loads impart an impact load on the pin which in turn transmits an impact load on the hub causing wear to the circular slot and counter-bored hole. As the circular slot and counter-bored hole wears the movement of the pin can become greater thus further amplifying the impact loads transmitted from the separator plates. In addition the movement described of the drive pins can also allow the separator plates to oscillate further out of center relative to the hub center resulting in clutch noise and as the user re-engages the clutch through the disengagement mechanism.

Therefore a need exists for a clutch hub with non-moveable liners able to couple with clutch separator plates wherein the liners are fixed axially and radially to the hub providing non-moveable contact with separator plates.

It is therefore an object of the present invention to provide an improved clutch hub assembly to minimize hub wear from contact with separator plates while also improving the engagement and disengagement characteristics (clutch lever feel and/or modulation) the rider experiences when using the clutch lever to manually engage and disengage the clutch.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The disclosed technology is a clutch hub assembly including a fixed wear liner or drive member. This center clutch assembly is designed to work in a clutch, such as those that are used in motorcycles. These types of clutches have a clutch basket, a clutch pack, a center clutch, and a pressure plate. The clutch basket being coupled to an input and the center clutch being coupled to an output. When the clutch pack is compressed, the clutch basket and center clutch become rotationally coupled. The clutch pack is compressed by the pressure plate; the pressure plate provides a compressive force via a spring mechanism or through a centrifugally actuated mechanism. A clutch pack is made up of two types of plates—driving plates and driven plates. Driving plates are commonly referred to as friction discs and are coupled rotationally to a clutch basket. Driven plates are commonly referred to as separator plates and are coupled rotationally to the center clutch. Optionally, the driving plates can be formed without friction material and the friction material can be attached to the driven plates. The clutch basket has fingers and slots between the fingers. The clutch basket is operatively attached to the motorcycle motor. The clutch hub is operatively attached to the motorcycle transmission, and eventually to the wheel. The disclosed technology is a clutch hub assembly placed within a clutch. The clutch system includes a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output.

The disclosed clutch hub assembly is made up of having a generally round structure including at least one feature for locating and attaching wear liners or drive members to the clutch hub body such that the liners or drive members are non-moveable relative to the clutch hub body. Furthermore, the wear liners or drive members provide features for coupling and accepting torque loads from separator plates, also known as driven plates, within a clutch pack; in turn the wear liners or drive members will transmit the torque loads from the separator plates to the clutch hub body. The wear liners are generally cylindrically shaped at one end with a substantial portion for the wear liner comprising a semicircular cross-section continuing to the opposite end of the wear liner.

Optionally, cylindrical shaped drive members are pressed into undersized counter-bored holes within the flange of the clutch hub body while the opposite end of the drive members are clamped in place using a threaded fastener with clamping washer. The clamping washer having features which bias the drive member against the floor of the undersized counter-bored hole while also securing drive member such that it cannot rotate or move outward radially away from the axial center of the clutch hub body.

In another embodiment, non-round drive members are fastened to the clutch hub body utilizing cross-drilled and threaded holes formed into the non-round drive members and a threaded fastener such as a machine screw. In this embodiment the clutch hub contains features to support the non-round drive member along the axial direction of the clutch hub and length of the drive member Optionally, the wear liner is comprised of a generally u-shaped strip formed with flanges on either vertical legs where the liner slides into corresponding grooves formed into the clutch hub body; where the liner covers vertical wall features formed into the clutch hub body.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

Figure 13:
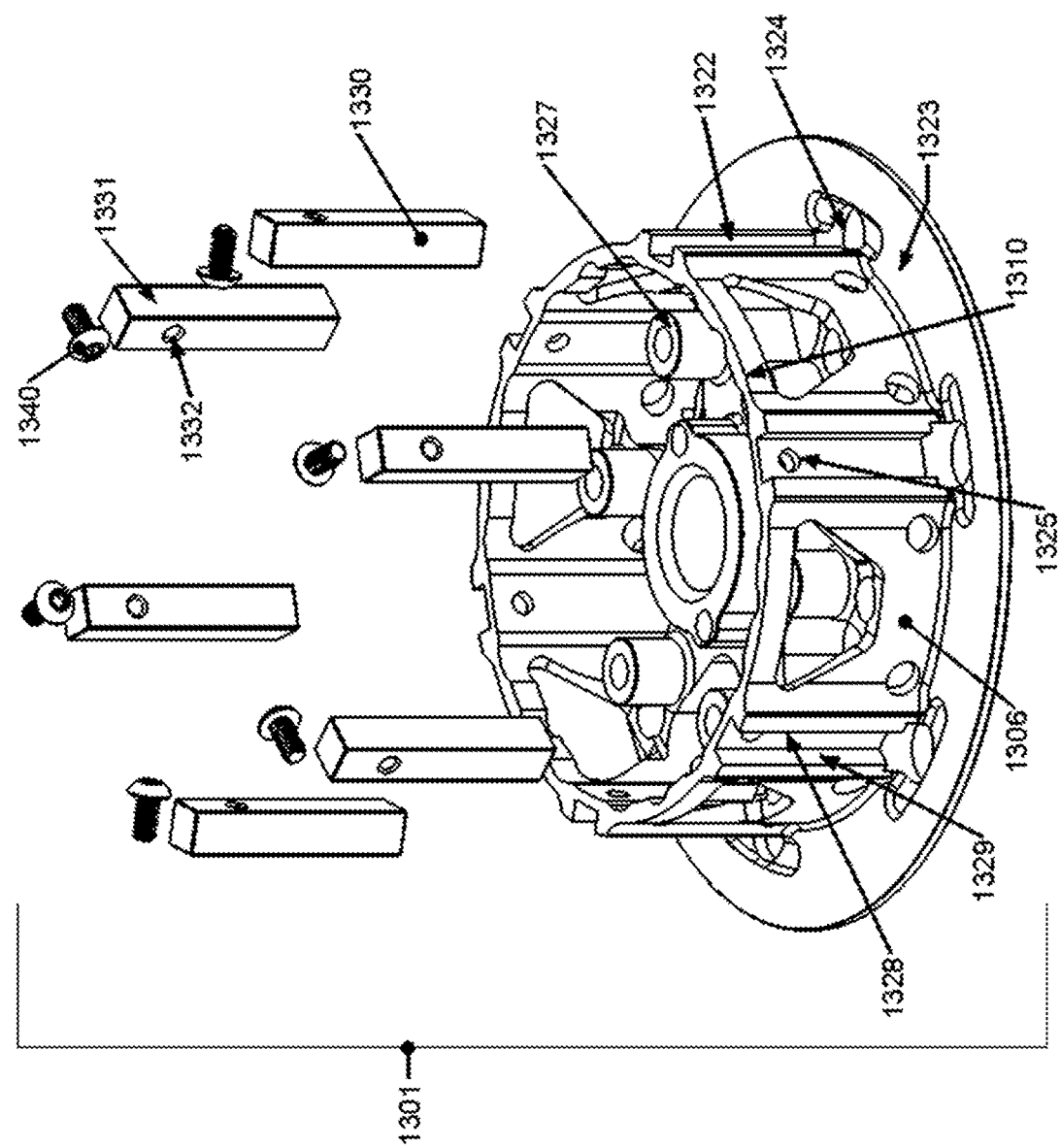
Figure 14A:
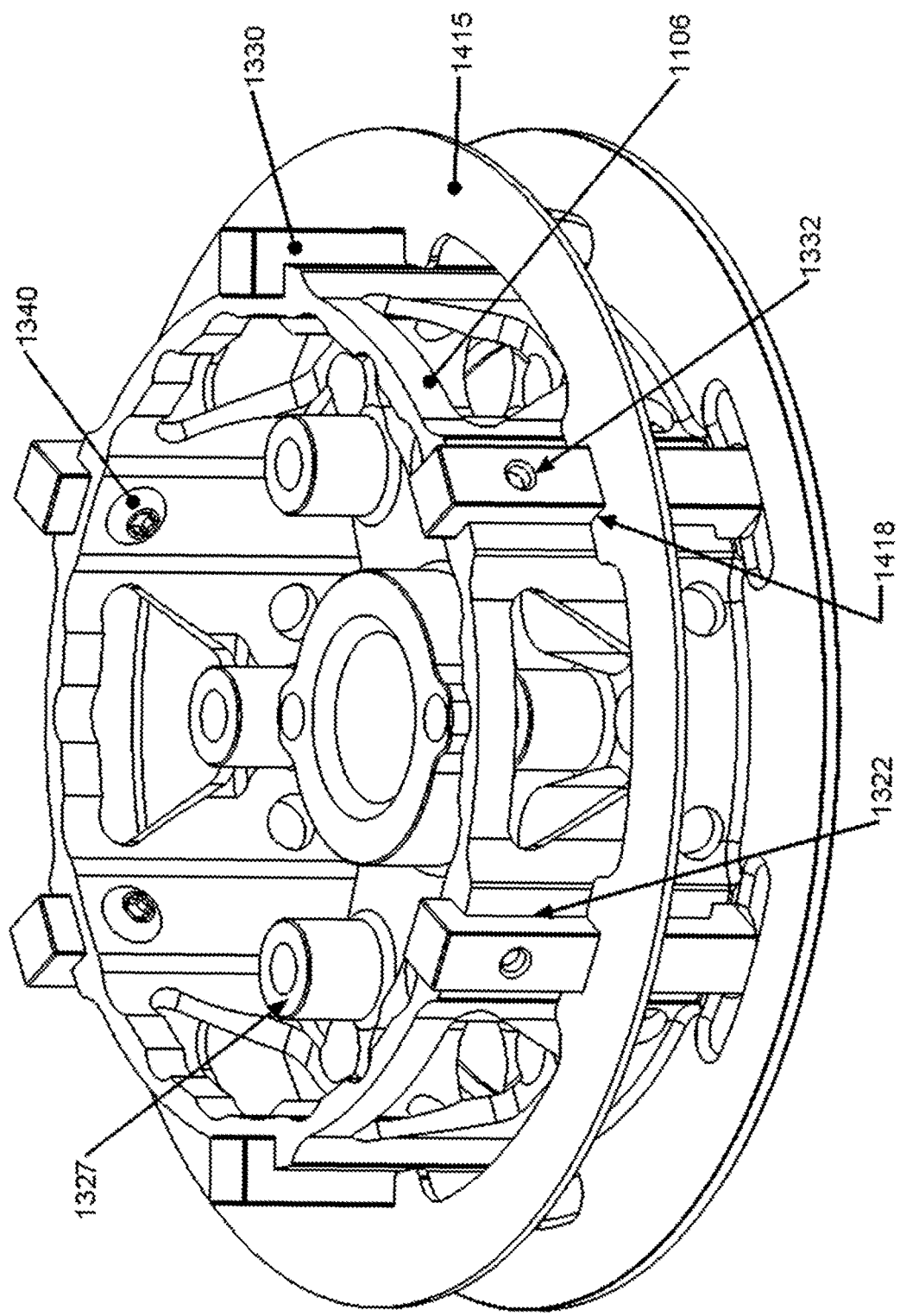
Figure 14B:
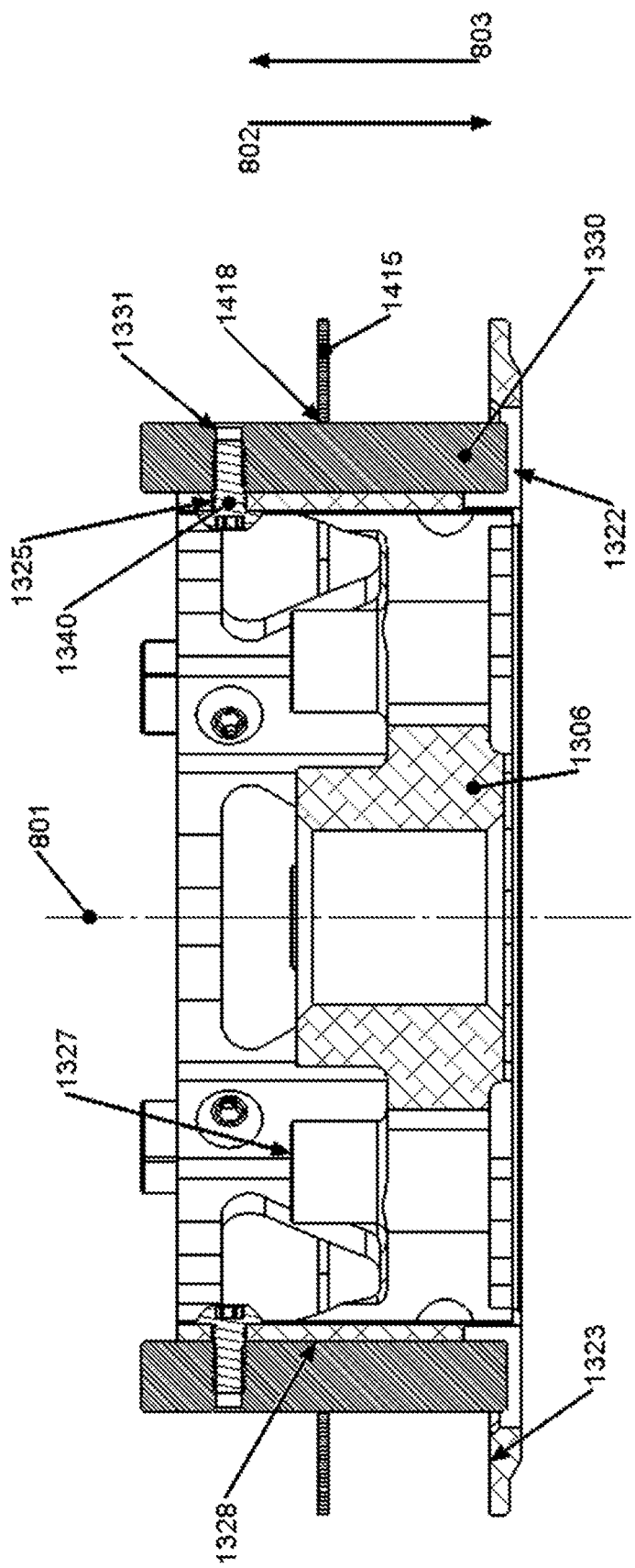
Figure 15:
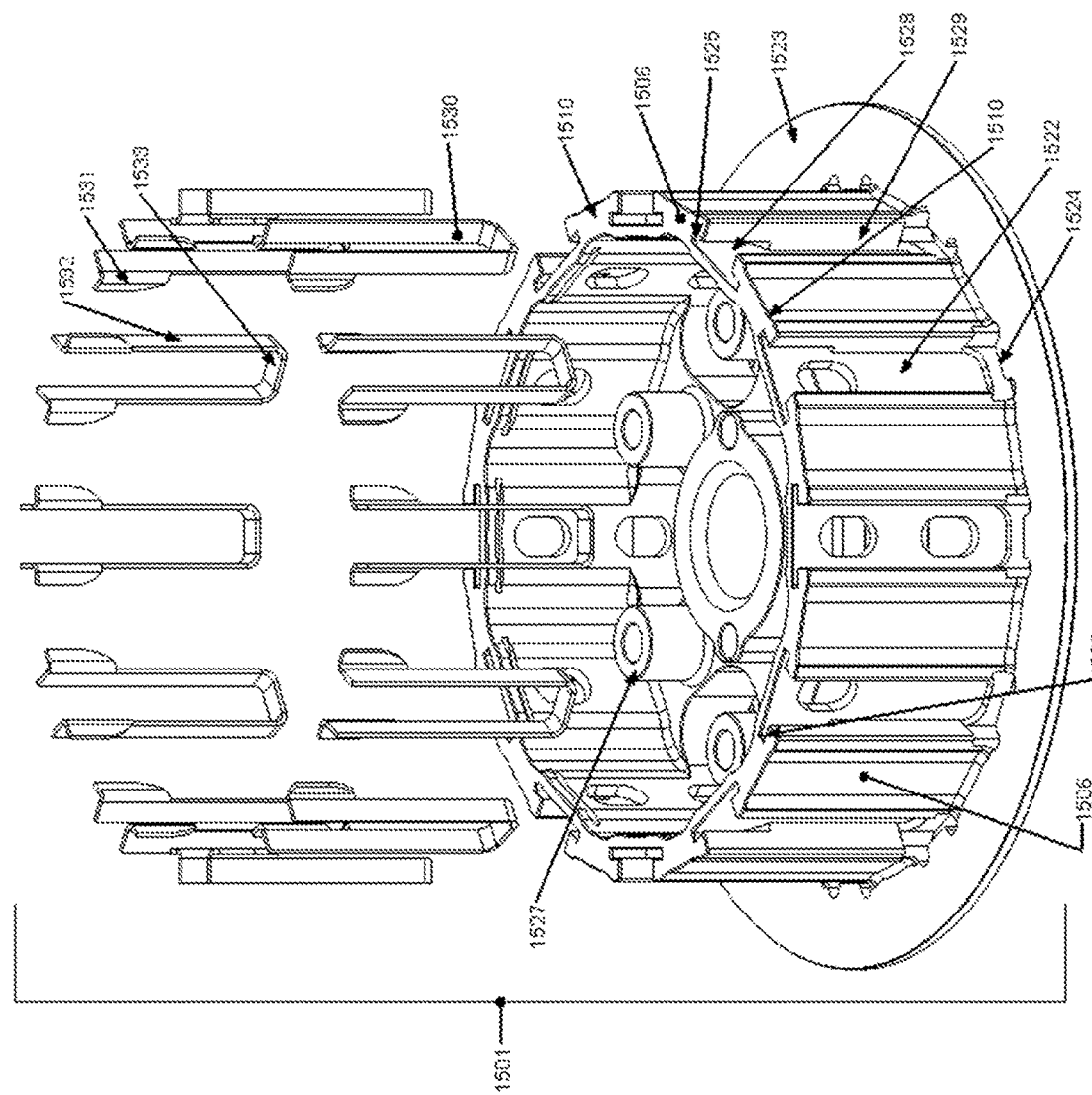
Figure 16A:
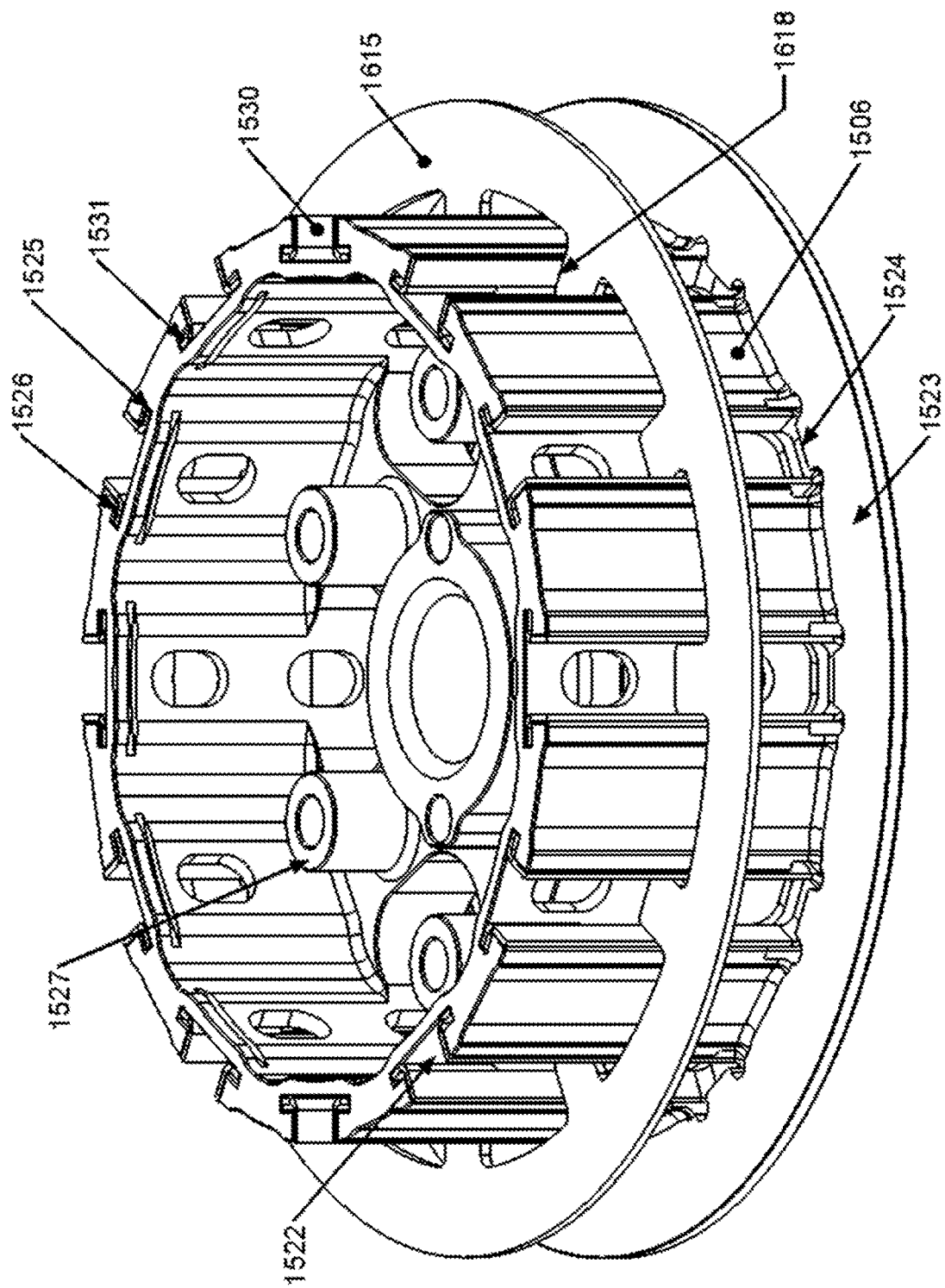
Figure 16B:
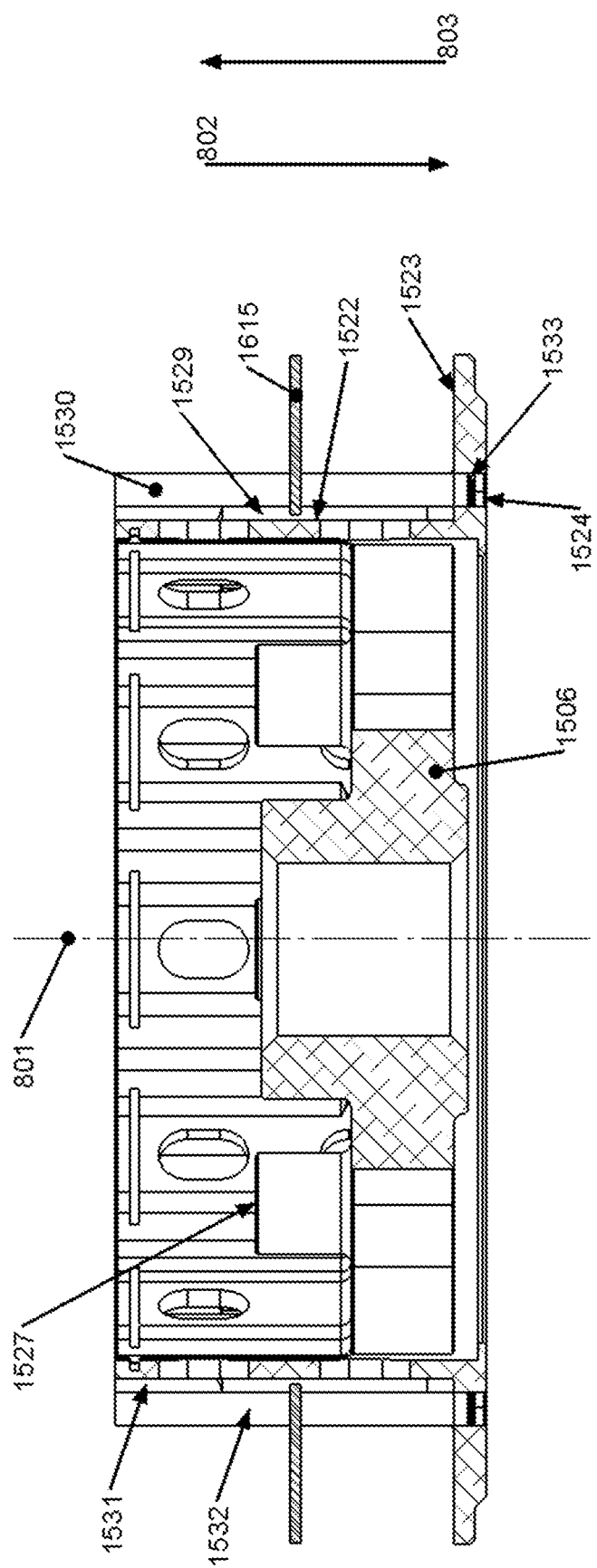
Figure 17:
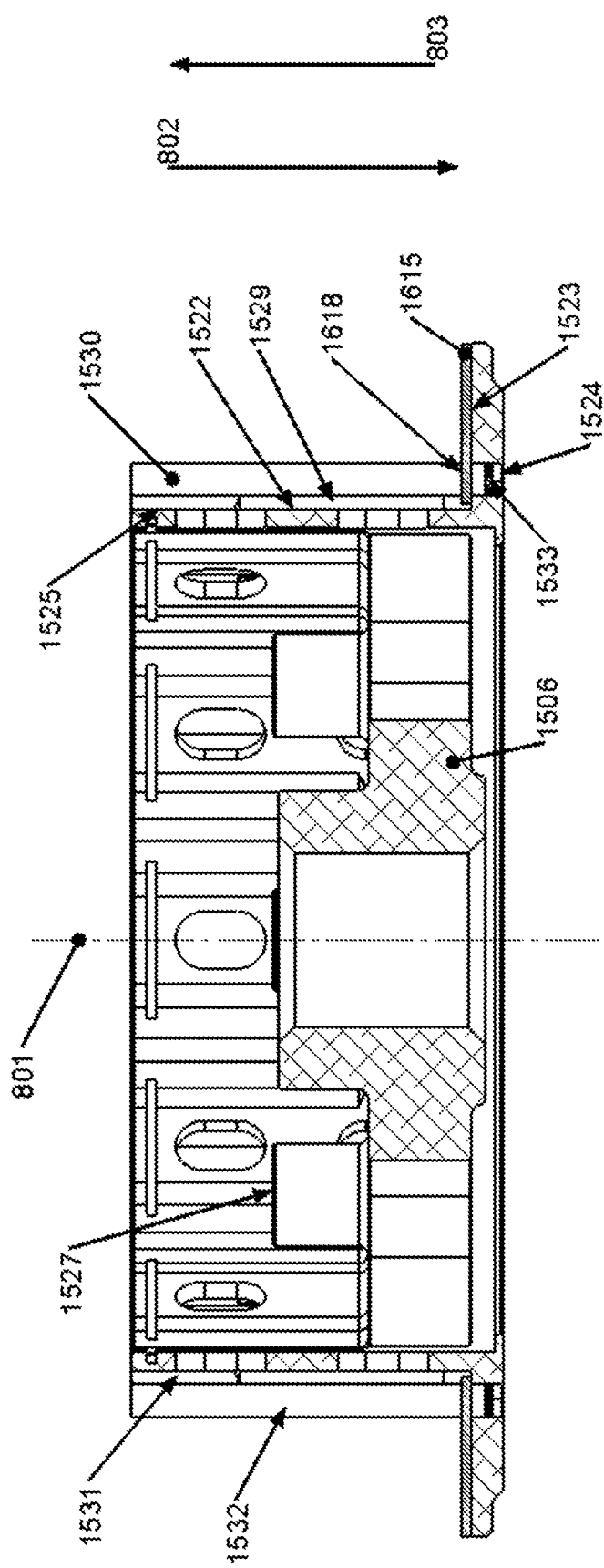

are top-side and bottom side isometric exploded views of an alternative embodiment clutch hub assembly including fixed drive members;

FIG. 13 is an exploded view of an alternative embodiment clutch hub assembly utilizing fixed drive members;

FIG. 14A is and isometric view of the clutch hub assembly shown in FIG. 13 including a separator plate;

FIG. 14B is a section view of the clutch hub assembly shown in FIG. 13;

FIG. 15 is an exploded view of an alternative embodiment clutch hub assembly utilizing u-shaped liners;

FIG. 16A is and isometric view of the clutch hub assembly shown in FIG. 15 including a separator plate;

FIG. 16B is a section view of the clutch hub assembly shown in FIG. 15;

FIG. 17 is a section view of the alternative embodiment clutch hub assembly shown in FIG. 15 with the separator plate shown in the position to limit axial movement of the u-shaped liners;

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Clutch hubs or center clutches are well known in the art and are typified by those used in clutches found in motorcycles and ATV's produced by Honda, KTM, Yamaha, Kawasaki and Suzuki among others.

A clutch hub is used within a typical clutch system comprised of a clutch input such as a clutch basket, a clutch output such as a clutch hub, a pressure plate and one or more disks making up a clutch pack and disposed between the clutch input and clutch output. When the clutch pack is compressed, the clutch input and clutch output become rotationally coupled. Such clutch systems typically include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system.

The present invention provides for a novel, improved clutch hub assembly utilizing fixed wear liners or drive members attached to the clutch hub to provide coupling between at least one separator plate and said hub such that said separator plate can transmit torque loads through said drive member to said clutch hub without the position of said drive member changing relative to said clutch hub. Multiple embodiments are disclosed.

Figure 1:
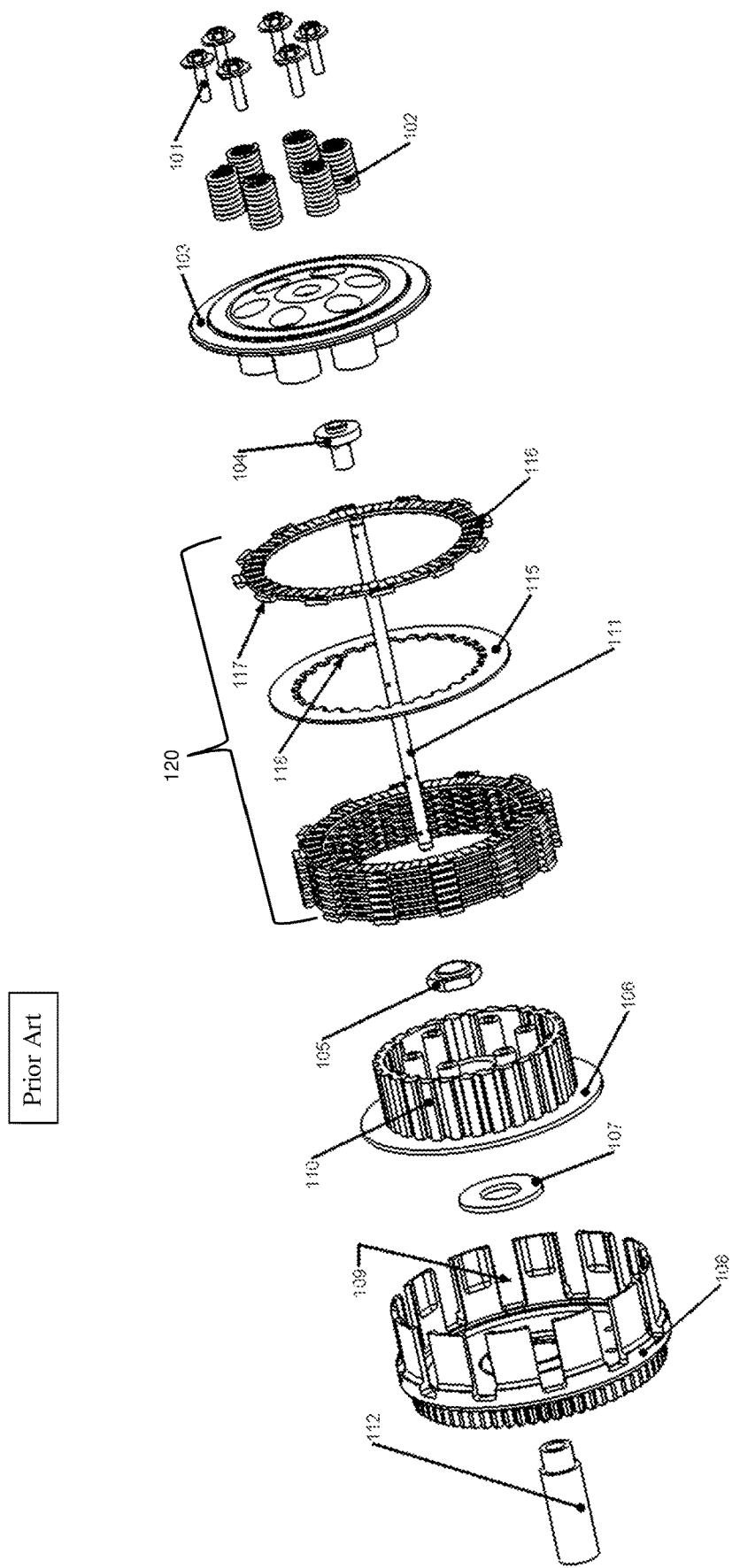
FIG. 1 is an exploded view of a prior art clutch using a one-piece aluminum hub.

FIG. 1 is an exploded view of a prior art clutch. The configuration of the clutch basket 108, clutch hub thrust washer 107, clutch hub 106, transmission input shaft 112, clutch hub nut 105, throw-out 104, throw-out rod 111, friction disk 116, separator plate 115, pressure plate 103, standard springs 102 and spring bolts 101 are typical of most modern motorcycle clutches, this structure is commonly employed in many types of power transmission devices. Clutch pack 120 is comprised of friction disks 116 and separator plates 115. The clutch basket 108 contains slots 109 which receive the friction disk tabs 117 and thus coupling the clutch basket 108 and friction disks 116 rotationally. The clutch hub 106 contains a profiled ring 110 which provides rotational coupling to the teeth 118 of the separator plates 115. The clutch basket 108 is typically coupled rotationally to a power input source such as an engine and the clutch hub 106 is typically coupled rotationally to an output such as a transmission through a transmission input shaft 112. In another embodiment the clutch basket 108 is coupled rotationally to an output and the clutch hub 106 is coupled rotationally to a power input. Typically the clutch basket 108 contains an opening in the center for receiving a transmission input shaft 112; the clutch basket 108 is configured with a bearing between the clutch basket 108 and the transmission input shaft so that the clutch basket 108 can rotate independently of the transmission input shaft with minimal friction. Typically a clutch hub thrust washer 107 is disposed between a clutch hub 106 and the clutch basket 108. A clutch hub nut 105 secures the clutch hub 106 against the clutch hub thrust washer 107 which in turn is secured against a shoulder (not shown) on the transmission input shaft 112. The clutch hub is typically rotationally coupled to the transmission input shaft 112 via a suitable spline.

Figure 2:
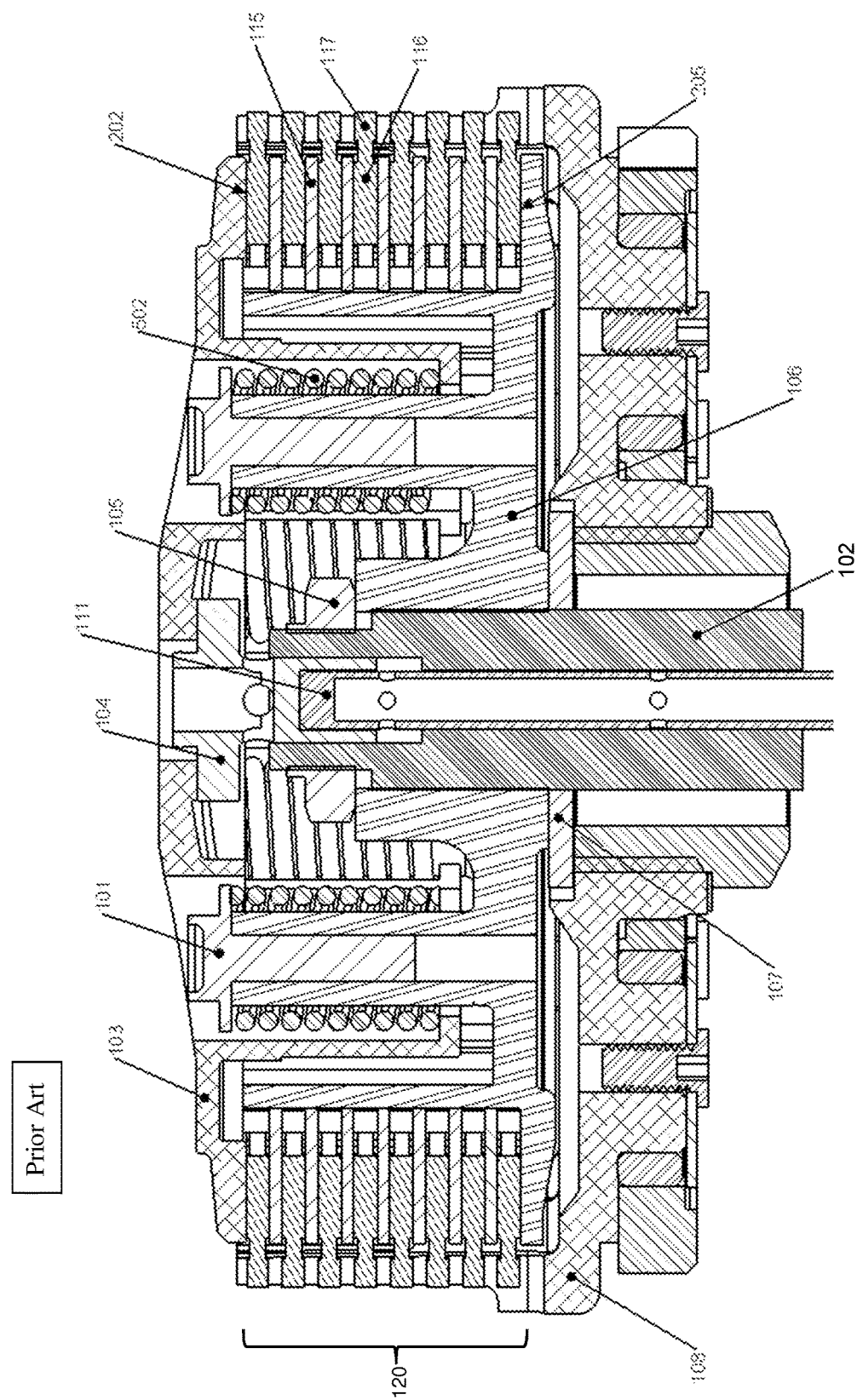
FIG. 2 is a section view of the prior art clutch shown in FIG. 1.

FIG. 2 is a section view of the prior art clutch shown in FIG. 1. As best seen in FIG. 2, the clutch pack 120 is comprised of eight friction disks 116 and seven separator plates 115. The clutch pack 120 establishes the distance between the pressure plate flange face 202 and clutch hub flange face 205. The standard springs 102 act on the pressure plate 103 to compress the clutch pack 120 forcing the adjacent surfaces of the friction disks 116 and separator plates 115 to become coupled rotationally and in turn coupling the basket 108 and clutch hub 106 rotationally. The throw-out 104 is coupled to a throw-out rod 111. The throw-out rod 111 is coupled to a clutch disengagement system (not shown). The clutch disengagement system (not shown) is operable to selectively position the throw-out rod 111 and throw-out 104 for the purpose of pushing the pressure plate 103 away from the clutch pack 120 to disengage the clutch. Alternatively, the clutch disengagement system (not shown) is operable to selectively position the throw-out rod 111 and throw-out 104 for the purpose of returning the pressure plate 103 into contact with the clutch pack 120 to engage the clutch. In another embodiment the clutch pack 120 is comprised of nine friction disks 116 and eight separator plates 115. In the preferred embodiment the clutch pack 120 is comprised of eight 3-millimeter thick friction disks 116 and seven 1.6-millimeter separator plates 115 resulting in the clutch pack 120 being approximately 35.2-millimeters tall. In other prior art the clutch pack 120 is less than 35-millimeters tall and is comprised of eight friction disks and seven separator plates that are less than 1.6-millimeters thick. In yet other prior art, the clutch pack 120 is taller than 35.2 millimeters and is comprised of nine friction disks which are approximately 4-millimeters thick and eight separator plates which are approximately 2-millimeters thick.

Figure 3:
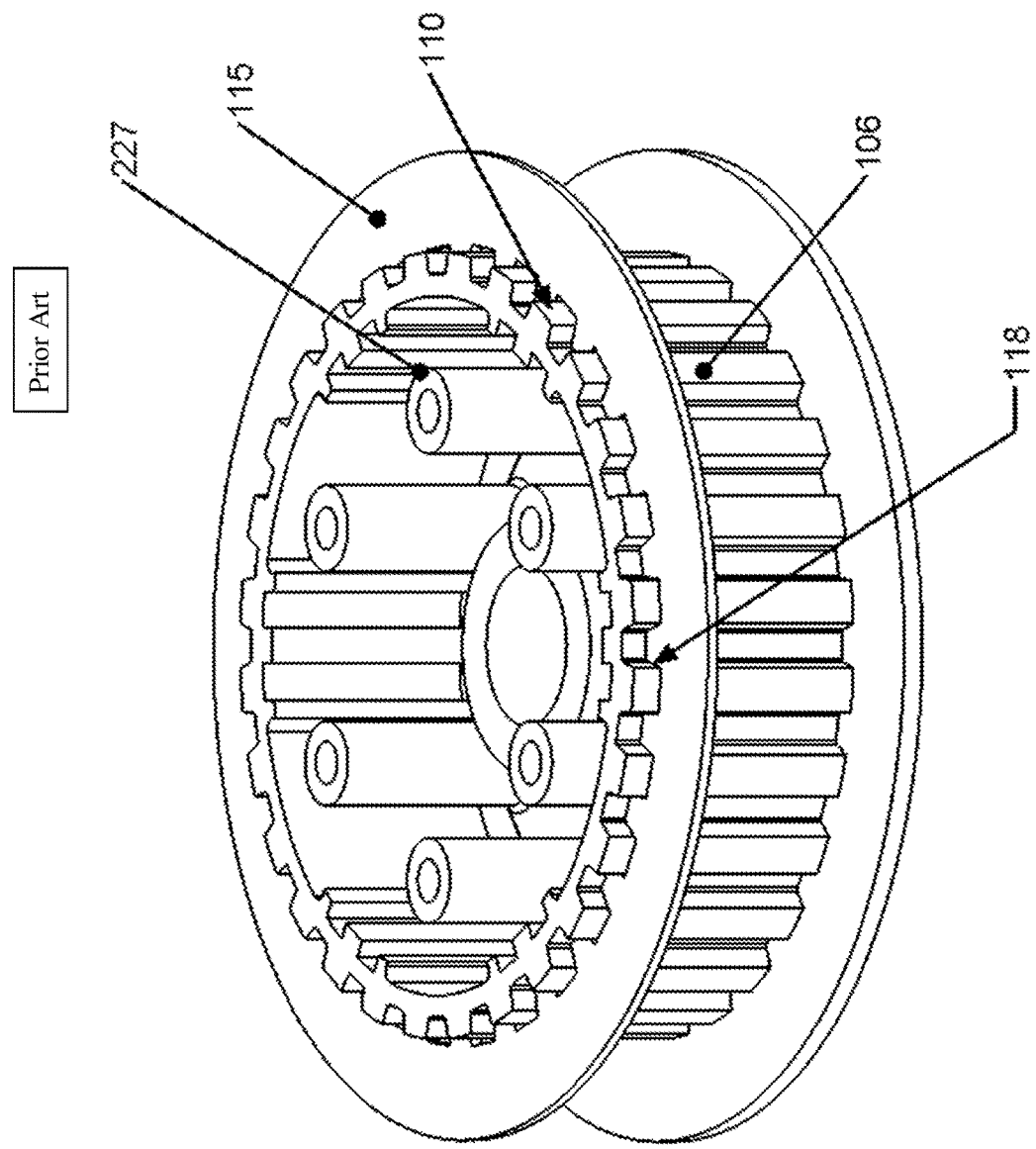
FIG. 3 is an isometric view of the hub and a separator plate used in the clutch shown in FIG. 1.

FIG. 3 is an isometric view of the clutch hub 106 and a separator plate 115 showing the rotational coupling between the profiled ring 110 and the teeth 118 of the separator plate 115.

Figure 4:
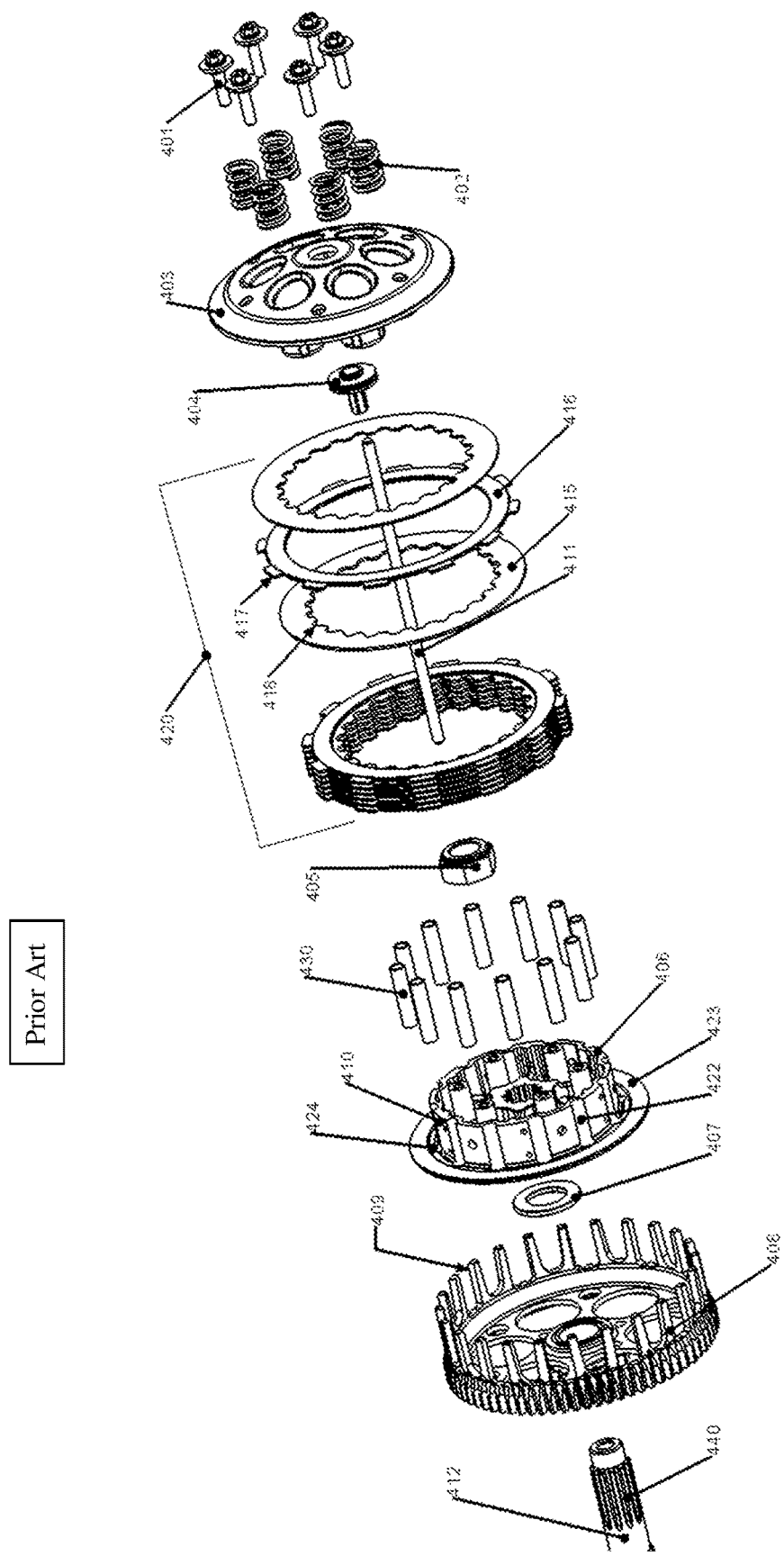
FIG. 4 is an exploded view of a prior art clutch using a hub with moveable drive pins.

FIG. 4 is an exploded view of an alternative prior art clutch utilizing a clutch hub 406 with moveable drive pins 430. The drive pins 430 are cylindrical in shape. The configuration of the clutch basket 408, clutch hub thrust washer 407, clutch hub 406, transmission input shaft 412, clutch hub nut 405, throw-out 404, throw-out rod 411, friction disk 416, separator plate 415, pressure plate 403, springs 402 and spring bolts 401. Clutch pack 420 is comprised of friction disks 416 and separator plates 415. The clutch basket 408 contains slots 409 which receive the friction disk tabs 417 and thus coupling the clutch basket 408 and friction disks 416 rotationally. The clutch hub 406 contains a profiled ring 410 containing semi-circular slots 422. The semi-circular slots 422 terminate in the flange 423 resulting in counter-bored hole 424 being formed into the flange 423 of the clutch hub 406. The semi-circular slots 422 and counter-bored hole 424 are of equal diameter and are of larger diameter than the outer diameter of the pins 430. The pins 430 provide rotational coupling to the cutouts 418 of the separator plates 415. The clutch basket 408 is typically coupled rotationally to a power input source such as an engine and the clutch hub 406 is typically coupled rotationally to an output such as a transmission through a transmission input shaft 412. In another embodiment the clutch basket 408 is coupled rotationally to an output and the clutch hub 406 is coupled rotationally to a power input. Typically the clutch basket 408 contains an opening in the center for receiving a transmission input shaft 412; the clutch basket 408 is configured with a bearing between the clutch basket 408 and the transmission input shaft 412 so that the clutch basket 408 can rotate independently of the transmission input shaft 412 with minimal friction. Typically a clutch hub thrust washer 407 is disposed between a clutch hub 406 and the clutch basket 408. A clutch hub nut 405 secures the clutch hub 406 against the clutch hub thrust washer 407 which in turn is secured against a shoulder (not shown) on the transmission input shaft 412. The clutch hub is typically rotationally coupled to the transmission input shaft 412 via a suitable spline 440.

Figure 5:
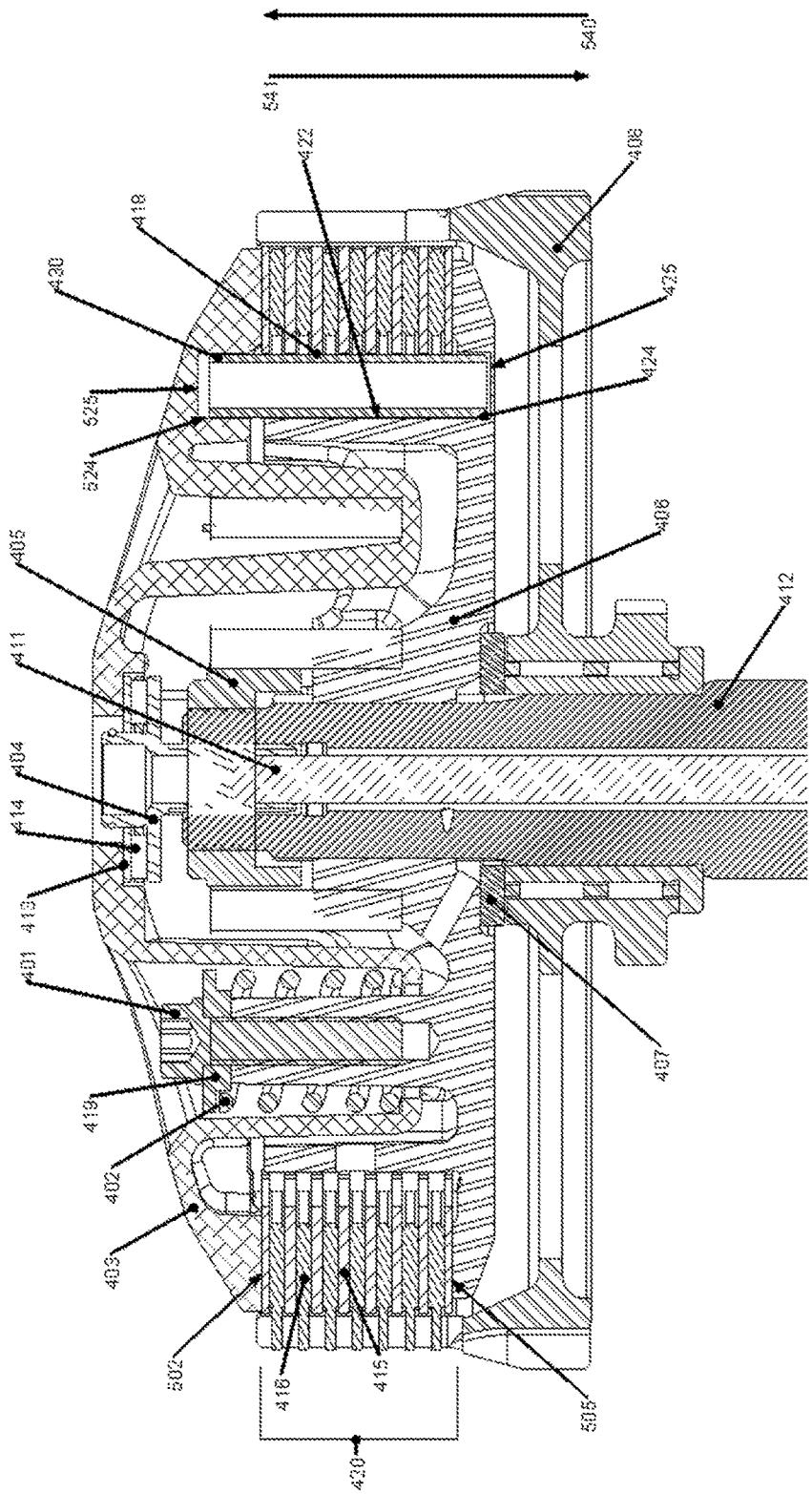
FIG. 5 is a section view of the prior art clutch shown in FIG. 4.

FIG. 5 is a section view of the prior art clutch shown in FIG. 4. As best seen in FIG. 5, the pins 430 are contained within the semi-circular slots 422 and counter-bored hole 424 of the clutch hub 406. The pressure plate 403 contains a second counter-bored hole 524 which is configured to receive one end of a pin 430 similar to the counter-bored hole 424 of the clutch hub 406. The second counter-bored hole is of larger diameter than the outer diameter of the pin 430. The clutch pack 420 is comprised of seven friction disks 416 and eight separator plates 415. The clutch pack 420 establishes the distance between the pressure plate flange face 502 and clutch hub flange face 505. The springs 402 act on the pressure plate 403 to compress the clutch pack 420 forcing the adjacent surfaces of the friction disks 416 and separator plates 415 to become coupled rotationally and in turn coupling the basket 408 and clutch hub 406 rotationally. With the pressure plate 403 in the position shown, the floor 425 of the counter-bored hole 424 and the second floor 525 of the second counter-bored hole 524 are separated by a distance which is longer than the pin 430 allowing the pin 430 to float axially in the directions parallel to line 540 and line 541. The throw-out 404 is coupled to a throw-out rod 411. The throw-out rod 411 is coupled to a clutch disengagement system (not shown). The clutch disengagement system (not shown) is operable to selectively position the throw-out rod 411 and throw-out 404 for the purpose of pushing the pressure plate 403 away from the clutch pack 420 to disengage the clutch. Alternatively, the clutch disengagement system (not shown) is operable to selectively position the throw-out rod 411 and throw-out 404 for the purpose of returning the pressure plate 403 into contact with the clutch pack 420 to engage the clutch. In another embodiment the clutch pack 420 is comprised of eight friction disks 416 and nine separator plates 415. In the preferred embodiment the clutch pack 420 is comprised of eight 2-millimeter thick friction disks 416 and nine 1.2-millimeter separator plates 415 resulting in the clutch pack 420 being approximately 26.8-millimeters tall. In other prior art the clutch pack 420 is less than 26.8-millimeters tall and is comprised of eight 2-millimeter thick friction disks and nine 1.0-millimeter thick separator plates.

Figure 6:
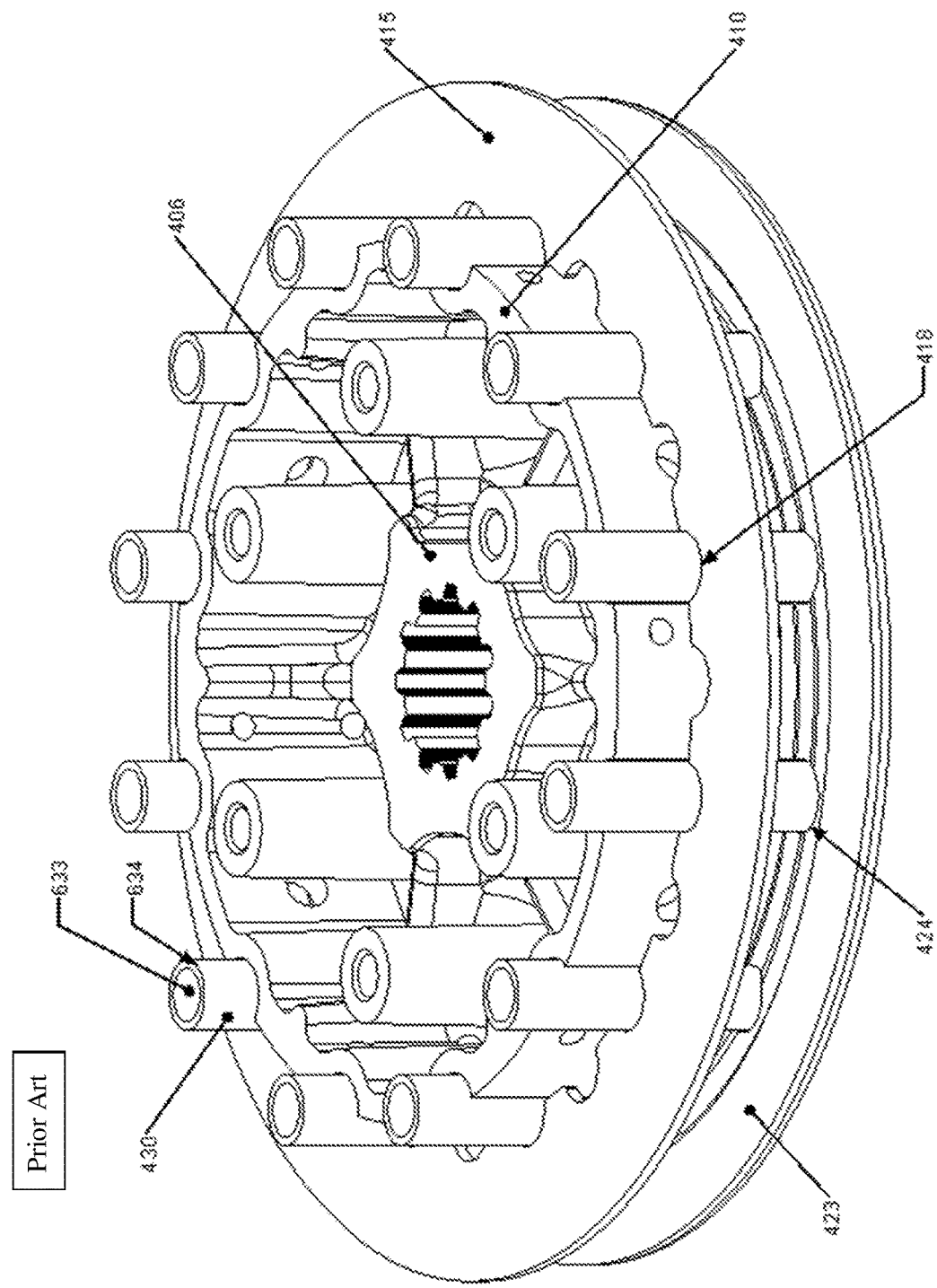
FIG. 6 is an isometric view of the hub, moveable drive pins and a separator plate used in the clutch shown in FIG. 4.

FIG. 6 is an isometric view of the clutch hub 406 with drive pins 430 and a separator plate 415 to show the rotational coupling between the profiled ring 410 and drive pin 430, specifically showing how each drive pin 430 is installed within a semi-circular slot 422 and a counter-bored hole 424, while also showing how each drive pin 430 is rotationally coupled to a cutout 418 of the separator plate 415. FIG. 6 identifies that the drive pin 430 is cylindrically shaped with through-hole 633 and outer diameter 634. In another embodiment the drive pin 430 is solid and does not contain through hole 633.

Figure 7:
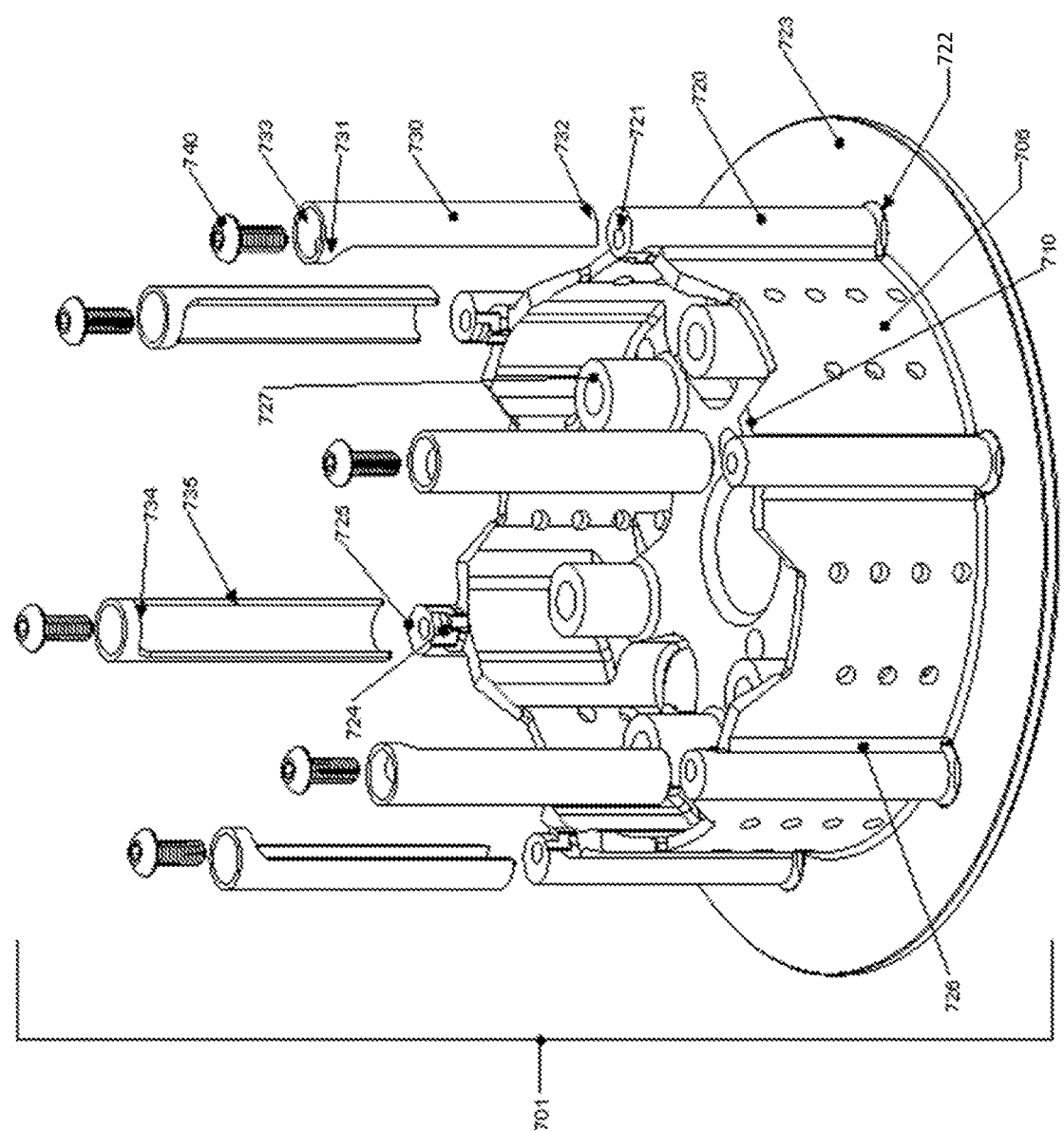
FIG. 7 is an isometric exploded view of a preferred embodiment clutch hub assembly including wear liners or sleeves.

FIG. 7 depicts an exploded view of the preferred embodiment clutch hub assembly 701 including a clutch hub 706, sleeve 730 and hold-down screw 740. The clutch hub 706 includes a profiled ring 710, flange 723, drive dowels 720, sleeve holes 722 and seating shelf 724. The drive dowel 720 has a generally cylindrical shape with a threaded hole 721 and a top 725. The seating shelf 724 is formed into the top 725. The clutch hub also includes a transition 726 between the drive dowel 720 features and profiled ring 710. Each sleeve hole 722 is placed such that the center of the sleeve hole 722 is on the same center as the center of the drive dowel 720. The sleeve 730 is comprised with a closed end 731, an open end 732, seating surface 734 vertical edges 735 and inner bore 733. The closed end 731 forms a complete cylinder shape. The inner bore 733 allows the sleeve 730 to slide over the drive dowel 720. In an alternate embodiment, the inner bore 733 has a diameter slightly smaller than the diameter of the drive dowel 720 requiring the sleeve 730 to be pressed over the drive dowel 720. The sleeve hole 722 has a working diameter slightly larger than the outer diameter of the sleeve 730 allowing the open end 732 to be passed into the sleeve hole 722. In an alternate embodiment the sleeve hole 722 has a working diameter slightly smaller than the outer diameter of the sleeve 730 requiring the open end 732 to be pressed into the sleeve hole 722 when it is positioned over the drive dowel 720.

Figure 8A:
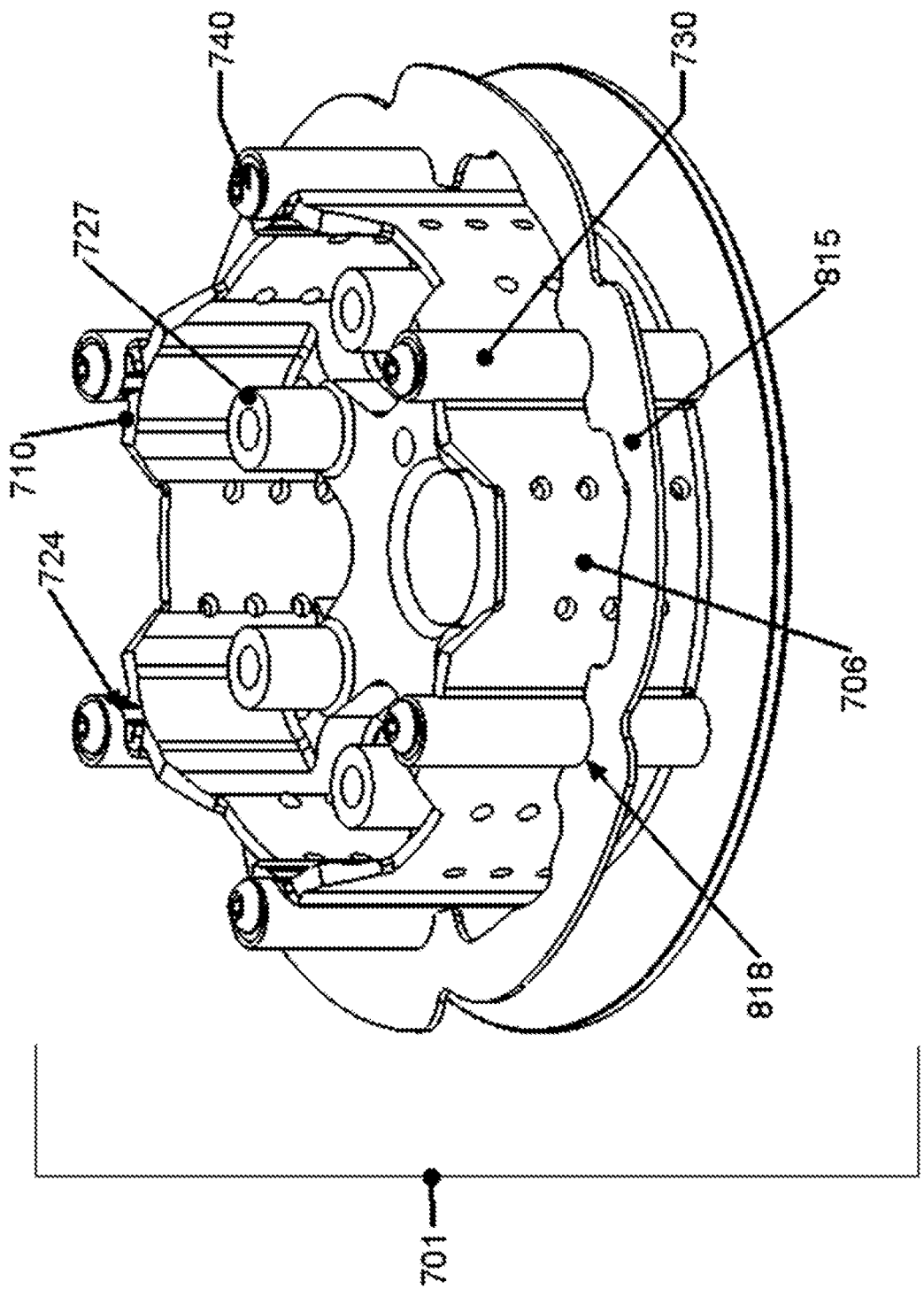
FIG. 8A is and isometric view of the clutch hub assembly shown in FIG. 7 including a separator plate.
Figure 8B:
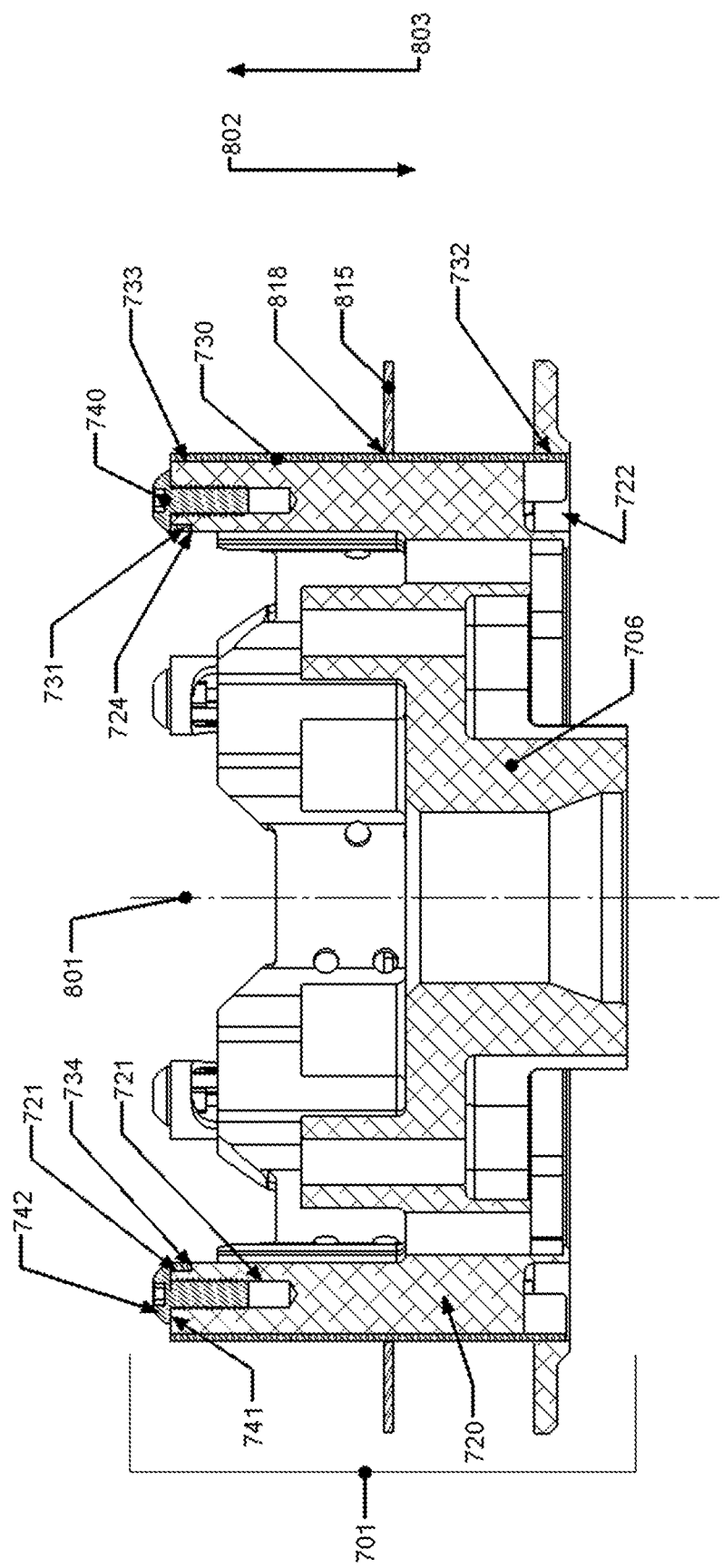
FIG. 8B is a section view of the preferred embodiment clutch hub assembly including wear liners shown in FIG. 7.

FIGS. 8A and 8B show the preferred embodiment clutch hub assembly 701 with the sleeves 730 installed over the drive dowels 720 of the clutch hub 706. The hold-down screws 740 affix the sleeves 730 to the clutch hub 706. As shown in FIGS. 8A and 8B the cutout 818 of the separator plate 815 is rotationally coupled to the sleeve 730.

As best seen in FIG. 8B, the open end 732 of the drive dowel 730 is placed into the sleeve hole 722. The closed end 731 is fitted over the top 725 of the drive dowel 720. The seating surface 734 of the sleeve 730 is positioned against the seating shelf 724 of the clutch hub 706. The hold-down screw 740 is threaded into the threaded hole 721. When the hold-down screw 740 is tightened the backside 741 of the screw head 742 applies a compressive force to the top of the closed end 731 driving the seating surface 734 against the seating shelf 724 resulting in locking the sleeve 730 in the inward direction 802 and outward direction 803 parallel to center axis 801. In another embodiment a washer is used between the hold-down screw 740 and closed end 731. The inner bore 733 of the closed end 731 with the working diameter of the top 725 prevent the sleeve 730 from moving radially in a direction perpendicular to center axis 801 away from the drive dowel 720. Similarly, the outer diameter of the sleeve 730 near the open end 732, with the sleeve hole 722, prevents the sleeve 730 from moving radially in a direction perpendicular to center axis 801 away from the drive dowel 720. When the screw 740 is not tightened fully the sleeve 730 is free to rotate slightly about the center of the drive dowel 730 until a vertical edge 735 contacts the transition 726. In an alternative embodiment the transition 726 is formed such that to provide an interference fit between the transition 726 and vertical edges 735 requiring the sleeve 730 to be pressed into the position shown in FIG. 8B resulting in the sleeve 730 being rotationally locked relative to the center of the drive dowel 720.

Figure 9:
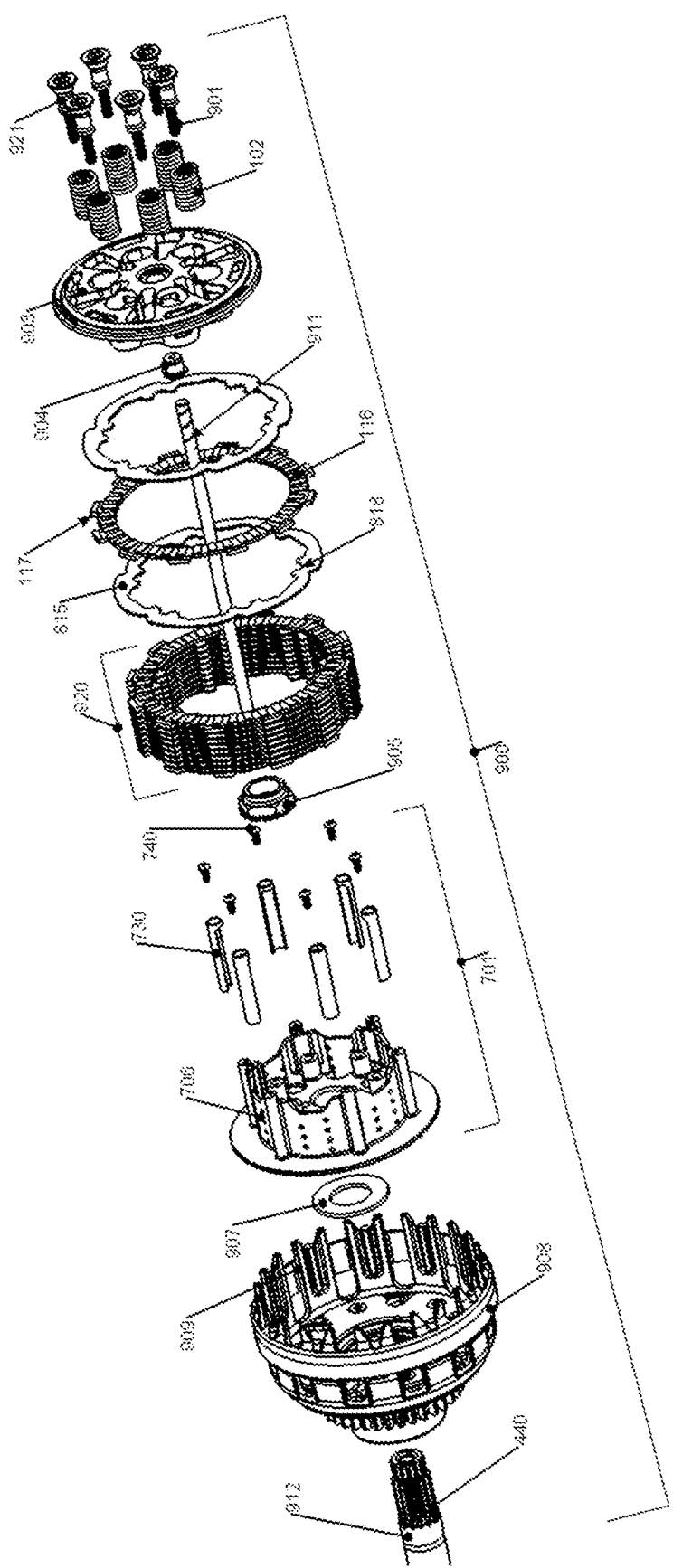
FIG. 9 is an exploded view of a multi-plate clutch including the preferred embodiment clutch hub assembly shown in FIGS. 7 through 8.

FIG. 9 depicts and exploded view of the preferred embodiment clutch hub assembly 701 configured within a multi-plate clutch assembly 900. The multi-plate clutch assembly shown in FIG. 9 shares similar characteristics to the multi-plate clutch assemblies previously disclosed in FIGS. 1 through 6. The multi-plate clutch assembly 900 includes a clutch basket 908, clutch hub thrust washer 907, clutch hub assembly 701, transmission input shaft 112, clutch hub nut 905, throw-out 904, throw-out rod 911, friction disk 116, separator plate 815, pressure plate 903, standard springs 102, spring bolts 901 and spring locators 921. Clutch pack 920 is comprised of friction disks 116 and separator plates 815. The clutch basket 908 contains slots 909 which receive the friction disk tabs 117 and thus coupling the clutch basket 908 and friction disks 116 rotationally. The clutch hub assembly 701 couples to the separator plate 815 via the sleeves 730 and cutouts 818 of the separator plate 815. The clutch basket 908 is typically coupled rotationally to a power input source such as an engine and the clutch hub assembly 701 is typically coupled rotationally to an output such as a transmission through a transmission input shaft 912. In another embodiment the clutch basket 908 is coupled rotationally to an output and the clutch hub assembly 701 is coupled rotationally to a power input. The clutch basket 908 contains an opening in the center for receiving the transmission input shaft 912; the clutch basket 908 is configured with a bearing (not shown) between the clutch basket 908 and the transmission input shaft 912 so that the clutch basket 908 can rotate independently of the transmission input shaft 912 with minimal friction. The clutch hub thrust washer 107 is disposed between the clutch hub assembly 701 and the clutch basket 908. A clutch hub nut 905 secures the clutch hub assembly 701 against the clutch hub thrust washer 907 which in turn is secured against a shoulder (not shown) on the transmission input shaft 912. The clutch hub assembly 701 is rotationally coupled to the transmission input shaft 912 via a suitable spline 440.

Figure 10:
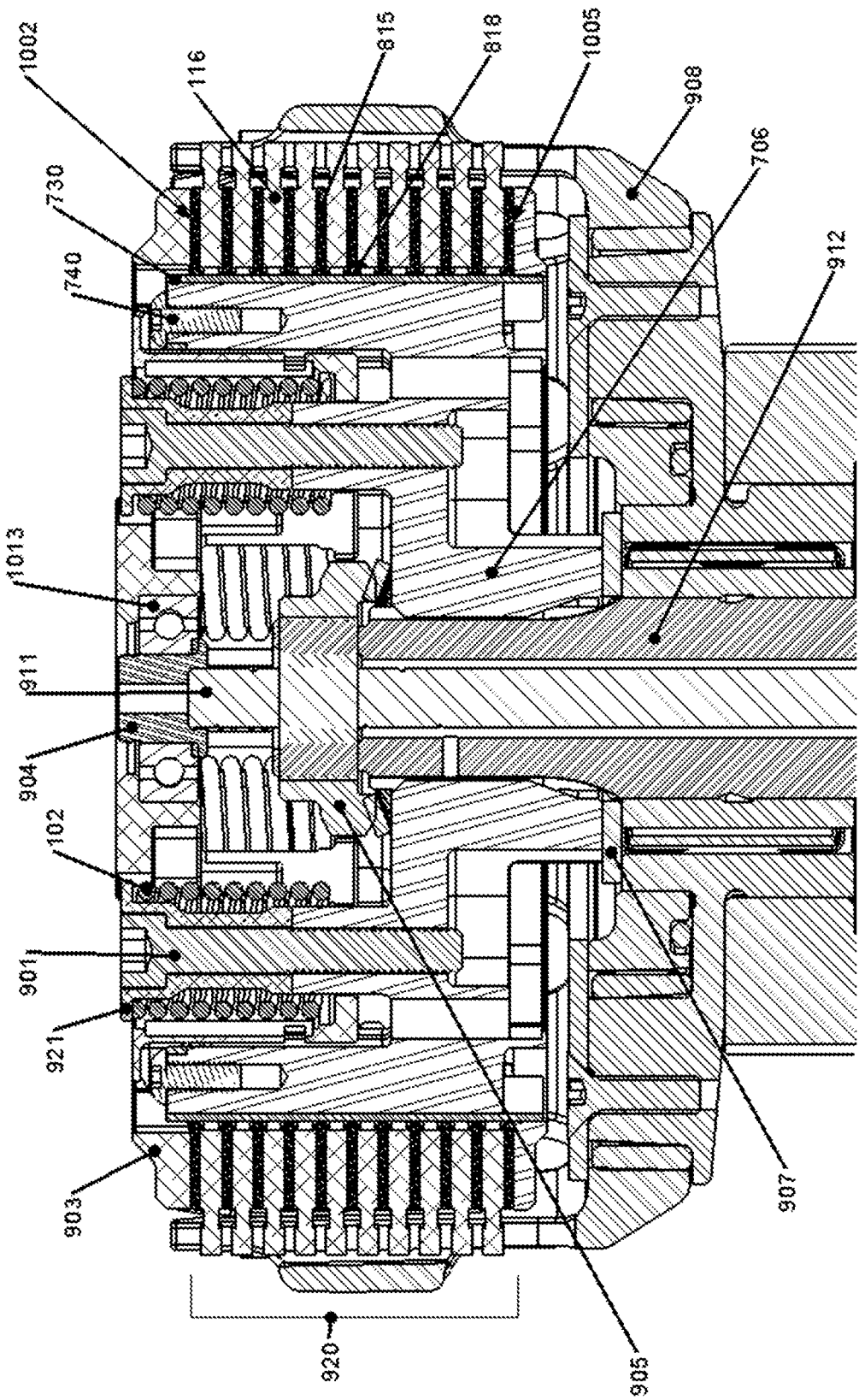
FIG. 10 is a section view of the multi-plate clutch shown in FIG. 9.

FIG. 10 is a section view of the prior art clutch shown in FIG. 9. As best seen in FIG. 9, the clutch pack 920 is comprised of ten friction disks 116 and eleven separator plates 815. The clutch pack 920 establishes the distance between the pressure plate flange face 1002 and clutch hub flange face 1005. The standard springs 102 act on the pressure plate 903 to compress the clutch pack 920 forcing the adjacent surfaces of the friction disks 116 and separator plates 815 to become coupled rotationally and in turn coupling the basket 908 and clutch hub assembly 701 rotationally. The throw-out 904 indexes into a pressure plate bearing 1013 allowing the throw-out 904 to turn independently of the pressure plate 903. The throw-out 904 is coupled to a throw-out rod 911. The throw-out rod 911 is coupled to a clutch disengagement system (not shown). The clutch disengagement system (not shown) is operable to selectively position the throw-out rod 911 and throw-out 904 for the purpose of pushing the pressure plate 903 away from the clutch pack 920 to disengage the clutch. Alternatively, the clutch disengagement system (not shown) is operable to selectively position the throw-out rod 911 and throw-out 904 for the purpose of returning the pressure plate 903 into contact with the clutch pack 920 to engage the clutch. In another embodiment the clutch pack 920 is comprised of nine friction disks 116 and ten separator plates 815. FIGS. 9 and 10 disclose the clutch hub assembly 701 used within the multi-plate clutch 901 where the multi-plate clutch 901 is of typical construction similar to the prior art multi-plate clutches disclosed in FIGS. 1 through 6 in order to demonstrate that the clutch hub assembly 701 could be used in place of the prior art clutch hub 106 disclosed in FIGS. 1 through 3 and the prior art clutch hub 406 disclosed in FIGS. 4 through 6.

Figure 11:
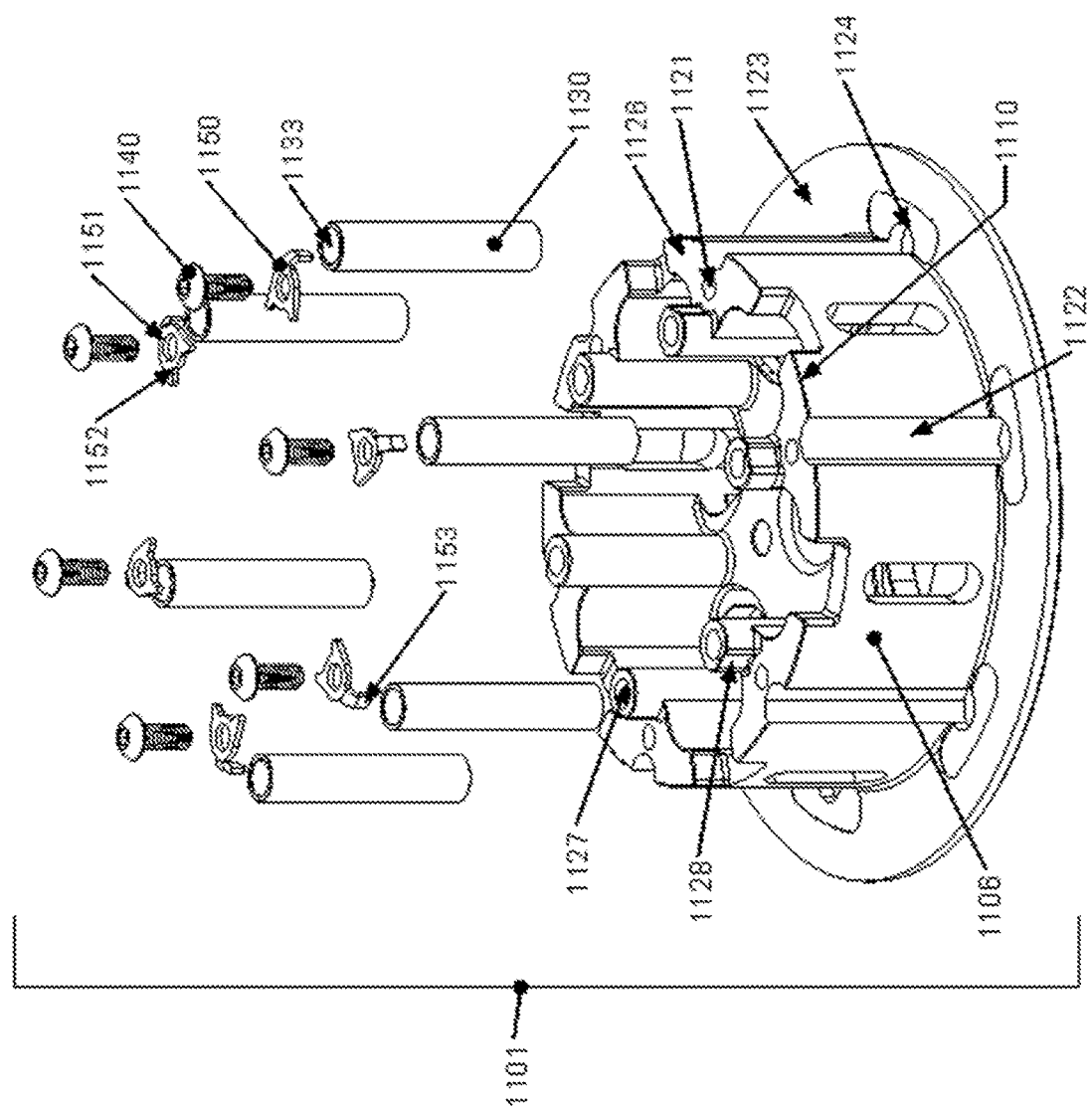
FIG. 11 is an exploded view of an alternative embodiment clutch hub assembly utilizing secured drive pins.

FIG. 11 depicts an exploded view of an alternative embodiment clutch hub assembly 1101 including a clutch hub 1106, drive pin 1130, hold-down screw 1140 and retention clip 1150. The clutch hub 1106 includes a profiled ring 1110, semi-circular slots 1122, flange 1123, counter-bored holes 1124, threaded holes 1121, shelf 1126, spring-bolt post 1127 and clip locating surface 1128. The semi-circular slots 1122 terminate into the flange 1123 resulting in counter-bored hole 1124 being formed into the flange 1123 of the clutch hub 1106. The semi-circular slots 1122 and counter-bored hole 1124 are of equal diameter and are of larger diameter than the outer diameter of the drive pins 1130. In another embodiment the semi-circular slots 1122 and counter-bored holes 1124 are of equal diameter and have a smaller diameter than the outer diameter of the drive pins 1130 requiring a drive pin 1130 to be pressed into a semi-circular slot 1122 and counter-bored hole 1124. The drive pin 1130 is cylindrical in shape and includes an inner bore 1133. The retention clip 1150 has through-hole 1151, locating surface 1152 and tab 1153.

Figure 12A:
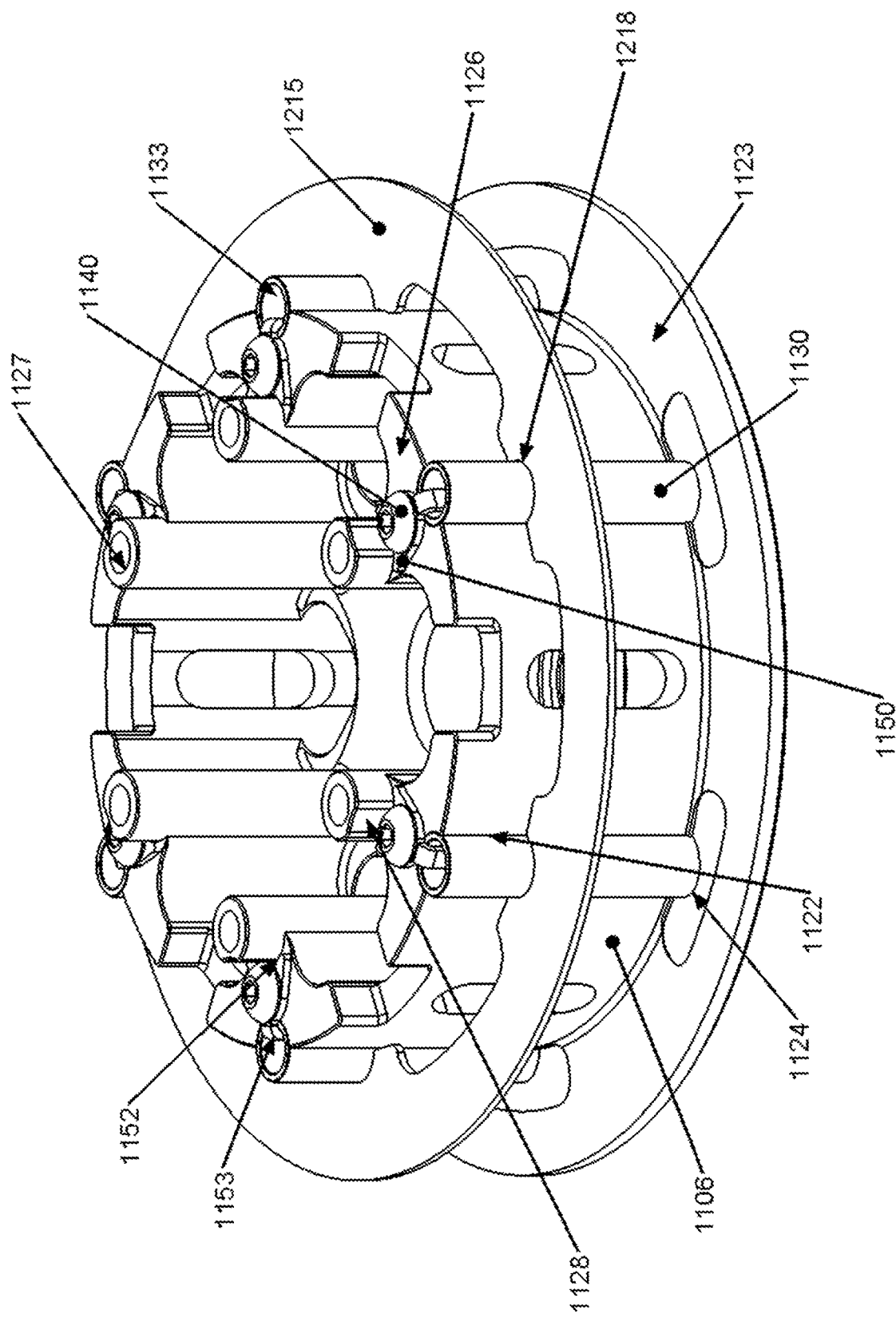
FIG. 12A is and isometric view of the clutch hub assembly shown in FIG. 11 including a separator plate.
Figure 12B:
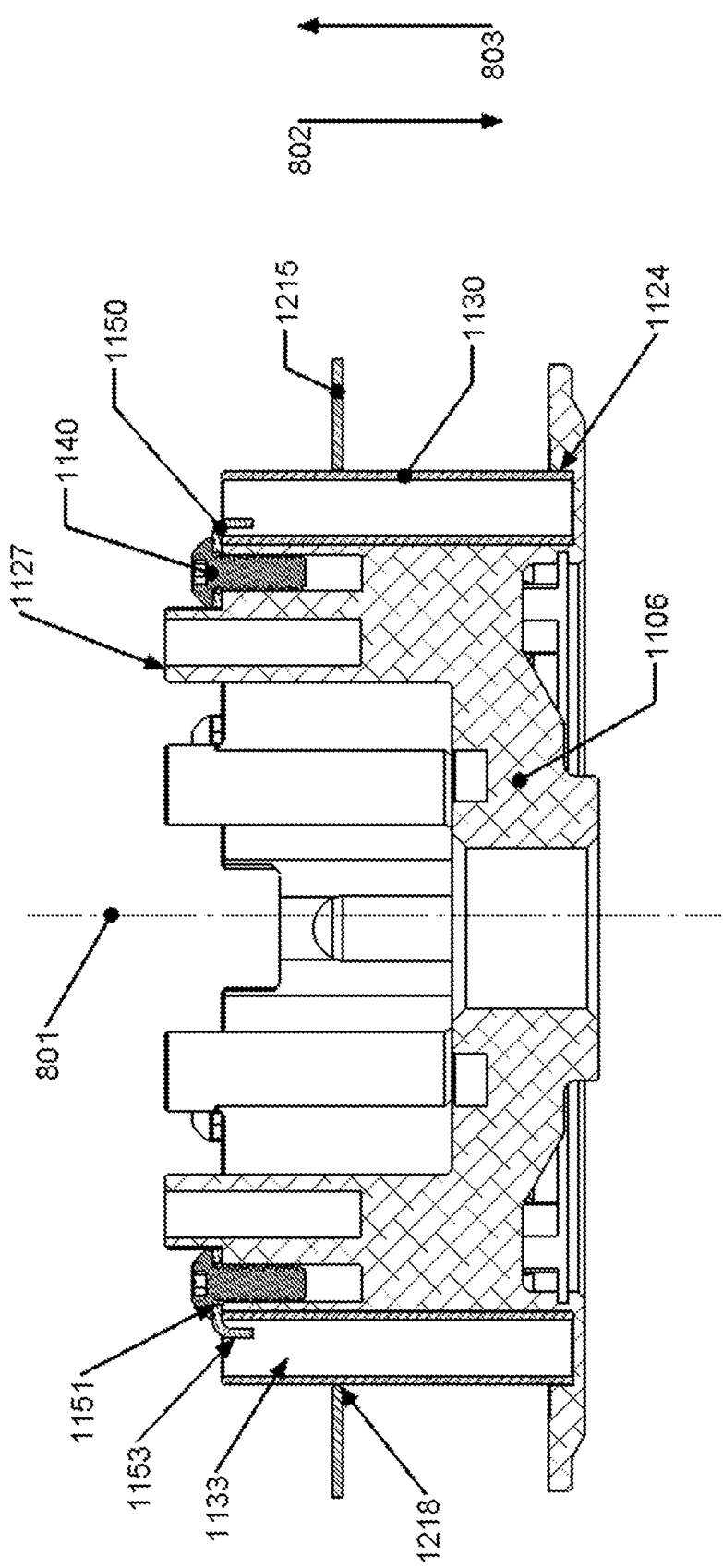
FIG. 12B is a section view of the clutch hub assembly shown in FIG. 11.

FIGS. 12A and 12B show the clutch hub assembly 1101 with the drive pins 1130 installed into the semi-circular slots 1122 and counter-bored holes 1124 of the clutch hub 1106. The hold-down screws 1140 affix the retention clips 1150 to the shelf 1126 of the clutch hub 1106. The retention clips 1150 are positioned such that the location surface 1152 is indexed and rotationally locked against the clip locating surface 1128 of spring-bolt post 1127 of the clutch hub 1106. The tab 1153 is received by the inner bore 1133 of drive pin 1130. Also, shown in FIGS. 12A and 12B the cutout 1218 of the separator plate 1215 is rotationally coupled to the drive pin 1130.

As best seen in FIG. 12B, one end of a drive pin 1130 is placed into a counter-bored hole 1124. The opposite end of the drive pin 1130 is secured via the tab 1153 of the retention clip 1150. With the tab 1153, the retention clip 1150 applies a compressive load against the top of the drive pin 1130 securing the pin into the counter-bored hole 1124 and thus constraining the drive pin 1130 such that it is non-moveable in direction 802 and direction 803, both parallel to center axis 801. The tab 1153 and counter-bored hole 1124 secure the drive pin 1130 such that the drive pin 1130 is non moveable in a radial direction perpendicular to center axis 801. In an alternative embodiment the retention clip 1150 is formed such that the underside of the retention clip 1150 completely covers the top surface of the drive pin 1130 and includes a indexing boss extending into the inner bore 1133 where the indexing boss secures the inner bore 1133 such that the drive pin is non-moveable in a radial direction perpendicular to center axis 801.

FIG. 13 depicts an exploded view of yet another alternative embodiment clutch hub assembly 1301 which could be utilized in place of the clutch hub assembly 701. The clutch hub assembly 1301 includes a clutch hub 1306, drive member 1330, and screw 1340. The clutch hub 1306 includes a profiled ring 1310, slots 1322, flange 1323, through holes 1324, radial holes 1325, and spring-bolt post 1327. The slots 1322 have a rectangular profile having side walls 1329 and back wall 1328. The slots 1322 each receive a drive member 1330. The drive members 1330 are comprised of a square shaped cross-section extending for a suitable length to accommodate various clutch pack heights. Each drive member 1330 contains side walls 1331 and a threaded hole 1332.

FIGS. 14A and 14B show the clutch hub assembly 1301 with the drive members 1330 installed into the slots 1322 of the clutch hub 1106. The screws 1340 pass through the radial holes 1325 and affix the drive members 1330 to the clutch hub 1306 via the threaded holes 1332. Also, shown in FIGS. 14A and 14B the cutout 1418 of the separator plate 1415 indexes to a drive member 1330 rotationally coupling the separator plate 1415 to the clutch hub assembly 1301.

As best seen in FIG. 14B, one end of a drive member 1330 is passes into the through hole 1322. The screws 1340 and side walls 1329 of the slots 1322 secure the drive member 1330 such that the drive members 1330 are non-moveable in any direction relative to the clutch hub 1306. In an alternative embodiment the drive member 1330 has a trapezoid cross-sectional shape. In yet another embodiment the drive member 1330 has a rounded profile with a flat along its length for mating against a back wall 1328.

FIG. 15 depicts an exploded view of yet another alternative embodiment clutch hub assembly 1501 which could be utilized in place of the clutch hub assembly 701. The clutch hub assembly 1501 includes a clutch hub 1506 and u-shaped liner 1530. The u-shaped liner is comprised of vertical legs 1532, flaps 1531 and horizontal base 1533. The flaps 1531 are each connected to a vertical leg 1532 of the u-shaped liner 1530. The vertical legs 1532 are connected by a horizontal base 1533. The clutch hub 1506 includes a profiled ring 1510, slots 1522, flange 1523, t-slots 1525, flange slots 1524 and spring-bolt posts 1527. The slots 1522 have a rectangular profile with side walls 1529 and back wall 1528. The t-slots 1525 extend downward from the top of the profile ring 1510 toward the flange 1523 running parallel to the side walls 1529 of the slots 1522. Each t-slot 1525 forms overhang walls 1526 part way down and behind the side walls 1529. The purpose of the t-slot 1525 is to accept the flaps 1531 of the u-shaped liner 1530. The slots 1522 with t-slots 1525 together each receive a u-shaped liner 1530. When a u-shaped liner 1530 is placed into a slot 1522 the vertical legs 1532 cover the side walls 1529 of a slot 1522.

FIGS. 16A and 16B show the clutch hub assembly 1501 with the u-shaped liners 1530 installed into the slots 1522 of the clutch hub 1506. The flaps 1531 are received by the t-slot 1525. The overhang walls 1526 of each t-slot 1525 prevent the u-shaped liner 1530 from moving in a radial direction perpendicular to center axis 801. Also shown in FIGS. 16A and 16B the tooth 1618 of the separator plate 1615 indexes into the space between the vertical legs 1531 of a u-shaped liner 1530 rotationally coupling the separator plate 1615 to the clutch hub assembly 1501.

As best seen in FIG. 16B, the horizontal base 1533 of a u-shaped liner 1530 passes into the flange slot 1524.

FIG. 17 shows a cross-section of the clutch hub assembly 1501 with the bottom separator plate 1615 installed against the flange 1523. The position of the separator plate 1615 shown in FIG. 17 allows the tooth 1618 to cover the top of the horizontal base 1533 limiting the movement of the u-shaped liner 1530 in the direction toward the separator plate 1615 and parallel to center axis 800. The t-slot 1525 limits the movement of the u-shaped liner 1530 in the direction of line 860 parallel to center axis 800. In this embodiment the u-shaped liner 1530 is free to move slightly within the slot 1522, however, the slight movement of the u-shaped liner does not affect the rotational coupling of the separator plate 1615 and will also be unlikely to create wear leading to degraded performance like some prior art systems. In this embodiment the u-shape of the liner coupled with the t-slot serve as a fastening mechanism to retain the u-shaped liner within the rectangular slot of the profiled ring. Thus, it is expected that clutch hub assembly 1501 will provide similar performance as clutch hub assembly 701 which utilizes fixed drive sleeves. In an alternative embodiment clutch hub assembly 1501 includes a locking feature to fix the u-shape liner 1530 resulting in the u-shaped liner begin non-moveable in any direction relative to the slot 1522.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A clutch hub assembly for use in a clutch of the type having a clutch basket with fingers and slots, at least one driven plate and at least one driving plate, wherein said clutch basket is rotationally coupled to said driving plate, wherein said clutch hub is configured for selective rotational coupling to said driven plate in response from pressure from a pressure plate, said clutch hub assembly comprising
   a clutch hub, wherein said clutch hub comprising a feature configured for mating engagement with a drive member;
   a retaining mechanism configured for connecting said drive member to said feature wherein said retaining mechanism is configured to limit movement of said drive member relative to said feature independent from said pressure plate; and
   wherein said drive member is configured to engage said at least one driven plate such that said driven plate is rotationally coupled to said clutch hub.

2. The clutch hub assembly of claim 1, wherein said feature comprises a dowel, wherein said drive member comprises a sleeve configured to slide over said dowel in mating engagement.

3. The clutch hub assembly of claim 2, wherein said retaining mechanism is a threaded fastener configured to connect said sleeve to said dowel through a first end of said sleeve to a first end of said dowel.

4. The clutch hub assembly of claim 3 wherein said feature comprises a female opening configured to fixedly receive said threaded fastener.

5. The clutch hub assembly of claim 2, wherein said dowel is connected to said clutch hub assembly at a second end of said dowel, wherein said clutch hub assembly comprises an opening configured to receive a second end of said sleeve when said sleeve is placed over said dowel.

6. The clutch hub assembly of claim 2, wherein said drive member comprises a generally cylindrical shape comprising an open end.

7. The clutch hub assembly of claim 2, wherein said clutch hub comprises a profiled ring, wherein said dowel is integral with said profiled ring.

8. The clutch hub assembly of claim 7, wherein said drive member comprises a first end comprising a generally cylindrical shape and a second end comprising an opening in a side of said cylinder, wherein said opening in said cylinder extends along a length of said cylinder approximate to a height of said profiled ring.

9. The clutch hub assembly of claim 2, wherein said retaining mechanism comprises a threaded fastener, wherein said drive member comprises an opening through said profiled ring configured for acceptance of a fastener, wherein said drive member comprises an opening in said feature configured for accepting said fastener to fasten said drive member to said profiled ring via said opening through said profiled ring.

10. The clutch hub assembly of claim 1, wherein said retaining mechanism comprises a threaded fastener.

11. The clutch hub assembly of claim 1 wherein said clutch hub comprises a profiled ring, wherein said retaining mechanism is configured to fasten said drive member to said profiled ring.

12. The clutch hub assembly of claim 1, wherein said clutch hub comprises a profiled ring, wherein said feature is integral in said profiled ring.

13. The clutch hub assembly of claim 12, wherein said feature comprises a rectangular slot in said profiled ring configured to accept a drive member comprising a square shaped cross section.

14. The clutch hub assembly of claim 12 wherein said feature comprises a generally rectangular groove, wherein said drive member comprises a generally U-shaped liner configured for mating engagement with said generally rectangular groove, wherein said U-shaped liner comprises two opposing vertical arms separated by a horizontal base, wherein said generally rectangular groove and said generally U-shaped liner are configured such that in mating engagement between said generally U-shaped liner and said groove said U-shaped liner are configured to engage a tooth on said driven plate between said two opposing vertical arms of said generally U-shaped liner.

15. The clutch hub assembly of claim 14, wherein each of said arms of said U-shaped drive member comprises a flange, wherein said retaining mechanism comprises a T-shaped slot in said profiled ring configured to engage each of said flange on each of arms of said U-shaped drive member to prevent radial movement of said U-shaped drive member in relation to a central axis of said clutch hub assembly.

16. The clutch hub assembly of claim 12 wherein said feature comprises a semi-circular slot in an outer circumference of said profiled ring, wherein said drive member comprises a generally cylindrical drive member.

17. The clutch hub assembly of claim 16, wherein said generally cylindrical drive member comprises a first open end and a second open end, wherein said retaining mechanism comprises a retention clip configured to attach to said profiled ring at a first end of said clip, wherein a second end of said retention clip is configured as a flange configured to insert into a second end of said generally cylindrical drive member and configured to retain said generally cylindrical drive member to said clutch hub assembly when said first end of said clip is attached to said profiled ring.

18. The clutch hub assembly of claim 1 wherein said retaining mechanism is configured to limit axial movement of said drive member.

19. The clutch hub assembly of claim 1 wherein said retaining mechanism is configured to limit radial movement of said drive member.

* * * * *